(12) United States Patent
Hall et al.

(10) Patent No.: US 11,820,698 B2
(45) Date of Patent: Nov. 21, 2023

(54) GLASS ARTICLES COATED WITH SILICA-BASED PARTING AGENT AND METHODS OF CERAMMING THE SAME

(71) Applicant: CORNING INCORPORATED, Corning, NY (US)

(72) Inventors: Jill Marie Hall, Elmira, NY (US); Mallanagouda Dyamanagouda Patil, Corning, NY (US); John Richard Ridge, Hammondsport, NY (US); Elizabeth Margaret Wheeler, Lindley, NY (US); Michael Aaron Zahradka, Painted Post, NY (US); Christine Marie Ziegenfus, Erin, NY (US)

(73) Assignee: Corning Incorporated, Corning, NY (US)

( * ) Notice: Subject to any disclaimer, the term of this patent is extended or adjusted under 35 U.S.C. 154(b) by 35 days.

(21) Appl. No.: 17/336,582

(22) Filed: Jun. 2, 2021

(65) Prior Publication Data

US 2021/0380462 A1    Dec. 9, 2021

Related U.S. Application Data

(60) Provisional application No. 63/033,944, filed on Jun. 3, 2020.

(51) Int. Cl.
| | | |
|---|---|---|
| *C03B 40/033* | (2006.01) | |
| *C03B 32/02* | (2006.01) | |
| *C03C 17/25* | (2006.01) | |

(52) U.S. Cl.
CPC ............ *C03B 40/033* (2013.01); *C03B 32/02* (2013.01); *C03C 17/25* (2013.01); *C03C 2217/213* (2013.01); *C03C 2218/11* (2013.01); *C03C 2218/32* (2013.01); *C03C 2218/355* (2013.01)

(58) Field of Classification Search
None
See application file for complete search history.

(56) References Cited

U.S. PATENT DOCUMENTS

| | | |
|---|---|---|
| 4,855,000 A | 8/1989 | Gordon |
| 5,053,107 A | 10/1991 | Barber |
| 5,073,181 A | 12/1991 | Foster et al. |

(Continued)

FOREIGN PATENT DOCUMENTS

| | | | | |
|---|---|---|---|---|
| JP | 4704564 B2 * | 6/2011 | .......... | B41M 5/5218 |
| WO | 02/16280 A2 | 2/2002 | | |

(Continued)

OTHER PUBLICATIONS

Barthel et al., "Fumed Silica—Production, Properties, and Applications," Organosilicon Chemistry 11 (Year: 1996).*

(Continued)

*Primary Examiner* — David Sample
(74) *Attorney, Agent, or Firm* — Jeffrey A. Schmidt

(57) ABSTRACT

Coated glass articles for a glass-ceramic ceramming process including a parting agent coated on a surface of the glass article. The parting agent coating can comprise an aqueous dispersion comprising amorphous silicon dioxide agglomerate particles and a dispersant. The parting agent coating can be dried to forming a parting layer for glass articles in a glass stack for a ceramming process that transforms the glass articles into glass-ceramic articles.

20 Claims, 12 Drawing Sheets

(56) References Cited

U.S. PATENT DOCUMENTS

| | | | |
|---|---|---|---|
| 5,110,336 A | 5/1992 | Kadunce et al. | |
| 5,145,811 A | 9/1992 | Lintz et al. | |
| 7,108,889 B2 | 9/2006 | Bohland | |
| 7,598,210 B2 | 10/2009 | Olliges | |
| 9,334,461 B2 | 5/2016 | Wirtensohn et al. | |
| 10,239,780 B2 | 3/2019 | Beall et al. | |
| 2011/0039094 A1 | 2/2011 | Sivasankar et al. | |
| 2016/0102010 A1 | 4/2016 | Beall et al. | |
| 2021/0130228 A1 | 5/2021 | Cui et al. | |

FOREIGN PATENT DOCUMENTS

| | | | | |
|---|---|---|---|---|
| WO | WO-2007071960 A1 * | 6/2007 | .......... | B01F 17/0028 |
| WO | 2014/052203 A2 | 4/2014 | | |

OTHER PUBLICATIONS

International Search Report and Written Opinion of the International Searching Authority; PCT/US2021/035326 dated Sep. 17, 2021; 12 pages; European Patent Office.

ASTMD4464-15 ("Standard Test Method for Particle Size Distribution of Catalytic Materials by Laser Light Scattering").

\* cited by examiner

GLASS ARTICLES COATED WITH SILICA-BASED PARTING AGENT AND METHODS OF CERAMMING THE SAME

CROSS-REFERENCE TO RELATED APPLICATION

This application claims the benefit of priority under 35 U.S.C. § 119 of U.S. Provisional Application Ser. No. 63/033,944 filed on Jun. 3, 2020, the content of which is relied upon and incorporated herein by reference in its entirety.

FIELD

The present disclosure relates to parting agent materials and parting layers for ceramming processes used to ceram glass articles into glass-ceramic articles. Specifically, embodiments described in the present disclosure relate to parting agent materials and parting layers for making glass-ceramic articles for use in various industries, for example, optical display and electromagnetic charging devices.

BACKGROUND

There is a demand for high strength glass for consumer devices, for example portable electronic devices. Several materials are currently utilized on the market, including glass, zirconia, plastic, metal, and glass-ceramics. The advantage of utilizing a glass-ceramic is its strength performance and its high transparency, making it a viable choice for various applications, including optical display and electromagnetic charging applications.

Therefore, a continuing need exists for methods and products suitable for efficiently producing high quality glass-ceramic articles.

BRIEF SUMMARY

The present disclosure is directed to parting agent materials and parting layers for physically and chemically separating adjacent glass articles in a glass stack during a ceramming process. The parting agent materials and parting layers help prevent adhesion and stiction between adjacent articles during a ceramming cycle, which can reduce or eliminate undesirable warping of the articles during the cycle. The parting agent materials and parting layers can also be non-reactive with the glass composition of the glass articles such that, during a ceramming cycle, the parting agent materials and layers do not cause an undesirable phase change at surfaces of the glass articles. These characteristics of the parting agent materials and parting layers described in the present disclosure, among others, facilitate efficient manufacturing of high quality glass-ceramic articles.

A first aspect (1) of the present application is directed to a coated glass article including a glass article comprising a first surface, a second surface opposite the first surface, and a parting agent coated on the first surface of the glass article, the parting agent comprising an aqueous dispersion comprising amorphous silicon dioxide agglomerate particles and a dispersant.

In a second aspect (2), the dispersant according to the first aspect (1) can comprise a hydroxide or an acid.

In a third aspect (3), wherein the dispersant can comprise a hydroxide.

In a fourth aspect (4), the hydroxide according to the third aspect (3) is sodium hydroxide.

In a fifth aspect (5), the parting agent according to any one of aspects (1)-(4) can comprise 0.25 wt % to 1 wt % of the dispersant.

In a sixth aspect (6), the amorphous silicon dioxide agglomerate particles according to any one of aspects (1)-(5) can comprise a mean particle size in a range of 100 nanometers to 20 microns.

In a seventh aspect (7), the parting agent according to any one of aspects (1)-(6) can comprise 10 wt % to 30 wt % of the amorphous silicon dioxide agglomerate particles.

In an eighth aspect (8), the parting agent according to any one of aspects (1)-(7) can comprise a colloidal inorganic binding agent.

In a ninth aspect (9), the colloidal inorganic binding agent according to the eighth aspect (8) can comprise colloidal silicon dioxide.

In a tenth aspect (10), the parting agent according to any one of aspects (1)-(9) can comprise a pH in a range of 8.5 to 11.

In an eleventh aspect (11), the parting agent according to any one of aspects (1)-(10) can comprise a viscosity in a range of 5 cP to 160 cP.

In a twelfth aspect (12), the parting agent according to any one of aspects (1)-(10) can comprise a viscosity in a range of 5 cp to 50 cP.

In a thirteenth aspect (13), the parting agent according to any one of aspects (1)-(12) is not coated on the second surface of the glass article.

In a fourteenth aspect (14), the amorphous silicon dioxide agglomerate particles according to any one of aspects (1)-(13) are not colloidal particles.

In a fifteenth aspect (15), the dispersant according to any one of aspects (1)-(14) can adhere the amorphous silicon dioxide agglomerate particles to the first surface of the glass article.

In a sixteenth aspect (16), the parting agent according to the first aspect (1) is a dried parting layer and the coated glass article comprises a percent haze in a range of 0% to 50%.

A seventeenth aspect (17) of the present application is directed to a glass article stack including a first glass article comprising a first surface and a second surface opposite its first surface, a second glass article disposed over the first surface of the first glass article and comprising a first surface and a second surface opposite its first surface, and a parting layer disposed between the first surface of the first glass article and the second surface of the second glass article, where the parting layer is either: directly adhered to the first surface of the first glass article and in direct contact with the second surface of the second glass article but not adhered to the second surface of the second glass article, or directly adhered to the second surface of the second glass article and in direct contact with the first surface of the first glass article but not adhered to the first surface of the first glass article.

In an eighteenth aspect (18), the parting layer according to the seventeenth aspect (17) can comprise silicon dioxide.

In a nineteenth aspect (19), the parting layer according to the seventeenth aspect (17) can comprise amorphous silicon dioxide agglomerate particles.

In a twentieth aspect (20), the silicon dioxide agglomerate particles according to the nineteenth aspect (19) can comprise a mean agglomerate particle size in a range of 100 nanometers to 20 microns.

In a twenty-first aspect (21), the parting layer according to any one of aspects (17)-(20) can comprise a mean coating thickness in a range of 1 micron to 5 microns.

In a twenty-second aspect (22), the parting layer according to any one of aspects (17)-(21) can comprise a mean dry coverage of 0.5 gsm to 1.5 gsm.

In a twenty-third aspect (23), the parting layer according to any one of aspects (17)-(22) can comprise a thickness uniformity of +/−0.5 gsm.

A twenty-fourth aspect (24) of the present application is directed to a method of ceramming a plurality of glass articles, the method including coating a parting agent on a first surface of a first glass article, the parting agent comprising an aqueous dispersion comprising amorphous silicon dioxide agglomerate particles and a dispersant; drying the parting agent on the first surface of the first glass article; positioning a second glass article in direct contact with the dried parting agent to form a glass stack comprising the first glass article, the second glass article, and the dried parting agent; and exposing the glass stack to a ceramming cycle sufficient to ceram the first glass article and the second glass article into glass-ceramic articles.

In a twenty-fifth aspect (25), coating the parting agent on the first surface of the first glass article according to the twenty-fourth aspect (24) can comprise a coating process that does not coat the parting agent on a second surface of the first glass article opposite the first surface.

In a twenty-sixth aspect (26), the parting agent according to the twenty-fourth aspect (24) or the twenty-fifth aspect (25) can comprise 0.25 wt % to 1 wt % of the dispersant and 10 wt % to 30 wt % of the amorphous silicon dioxide agglomerate particles.

In a twenty-seventh aspect (27), the dried parting layer according to any one of aspects (24)-(26) is directly adhered to the first surface of the first glass article, and the dried parting layer is in direct contact with a second surface of the second glass article and is not adhered to the second surface of the second glass article.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
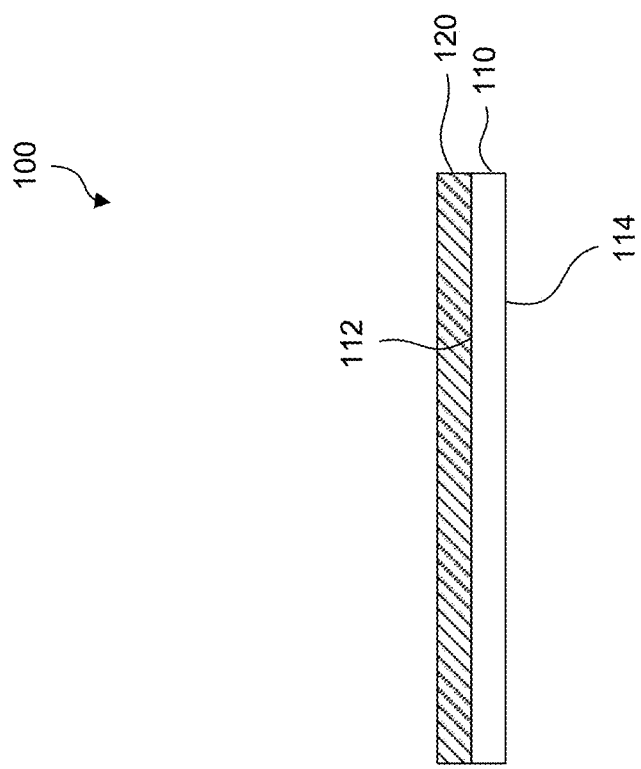
FIG. 1 illustrates a coated glass article according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

To achieve high throughput in a glass-ceramic manufacturing process, conventional ceramming processes can include stacking a plurality of glass sheets on a setter plate and ceramming the glass sheets to form glass-ceramics. However, in conventional ceramming processes, warping of the glass sheets can occur. In some instances, warping may result from glass sheets in the stack sticking to adjacent glass sheets and/or the setter plate during the process. Warping can effect, among other things, strength and optical properties of a glass-ceramic.

Embodiments described in the present disclosure are directed to a parting agent material for glass-ceramic manufacturing. The parting agent material is designed to reduce or prevent adhesion of an article to adjacent articles in a glass stack and/or a setter plate during a ceramming cycle. By reducing or preventing adhesion, the parting agent material can help reduce or eliminate warp (undesirable change in shape) of the articles during the ceramming cycle. And by reducing or eliminating warp, throughput of quality glass-ceramic articles can be improved.

Relatedly, the parting agent material is designed to prevent stiction between an article and adjacent articles in a glass stack and/or a setter plate during a ceramming cycle. During a ceramming cycle, articles in a glass stack can experience shrinkage during phase change and crystal growth. Parting agent materials described in the present disclosure facilitate free movement (expansion and/or contraction) of the articles within a glass stack during ceramming. By reducing or preventing stiction, the parting agent material can help reduce or eliminate warp of the articles during the ceramming cycle. And by reducing or eliminating stiction, throughput of quality glass-ceramic articles can be improved.

Additionally, parting agent materials described in the present disclosure have the ability to survive high temperature ceramming cycles (for example, ceramming temperatures exceeding 750° C.) without experiencing unwanted degradation. The materials can survive these high temperature ceramming cycles while also preventing adhesion and/or stiction between articles and/or between an article and a setter plate during a ceramming cycle.

Parting agent slurries described in the present disclosure can be aqueous parting agent slurries. The aqueous nature of the parting agent slurries can reduce or eliminate waste stream contamination. This aqueous nature can also provide parting agent materials that do not release volatile organic compounds (VOCs) during a glass-ceramic manufacturing process.

The parting agent materials described in the present disclosure can be non-reactive with the glass article on which it is coated. In other words, the parting agent materials can be non-reactive with the glass material composition of the glass article. Similarly, the parting agent materials described in the present disclosure can be non-reactive with the material of one or more setter plates used to hold glass articles during a ceramming cycle. A parting agent material that is "non-reactive" with a glass article means that the parting agent material does not tend to create a phase assemblage change in the glass composition of the glass article during a ceramming cycle. Similarly, a parting agent material that is "non-reactive" with the material of one or more setter plates means that the parting agent material does not tend to cause an undesirable oxide aggregation and surface roughening on a surface of the setter plate, which can lead to unwanted surface texture in a glass ceramic product. Also, a "non-reactive" material is thermally stable during a ceramming cycle, meaning that the material does not change in phase or oxidation state during a ceramming cycle. Some parting agent materials, for example boron nitride, can oxidize at high ceramming temperatures, which can lower the liquidus phase and result in glass and boron oxide deposits on a setter plate surface. This can lead to failure of the setter plate material.

The non-reactive nature the parting agent materials can reduce or eliminate the formation of a "skin" on a glass-ceramic article or a setter plate during a ceramming cycle. A "skin" formed during a ceramming cycle is an undesirable phase change of the glass composition at the surface of a glass article during a creaming cycle caused by a reaction between a parting agent and the glass article or the setter plate during ceramming. By reducing or eliminating the formation of a "skin," the parting agent materials can reduce or eliminate additional material removal steps that could be required to remove the skin during a finishing process. In some embodiments, parting agent materials described herein can avoid the formation of a "skin" having a depth of 5 microns or more on the surface of a glass article or setter plate.

Embodiments described in the present disclosure are also directed to an application process for the parting agent material. Application methods described herein facilitate the coating of a parting layer having desirable attributes. The application methods can deposit a parting layer having a desired thickness, thickness uniformity, and coverage uniformity. These attributes can help reduce or prevent bonding and stiction in a glass stack, help reduce or prevent warping in a glass stack, and/or can help reduce or eliminate the formation of a skin during a ceramming cycle. Also, these attributes can help reduce waste generation for a glass-ceramic manufacturing process, which can reduce the cost of the process. In some embodiments, the application method can include atomization of a parting agent slurry.

In addition to eliminating or preventing bonding between adjacent articles, the parting agent materials can be capable of adhering and bonding to a surface of a glass article on which they are coated. By suitably adhering and bonding to the surface of the glass article, the parting agent materials can reduce or eliminate the presence of loose parting agent material during a manufacturing process, thereby reducing or eliminating any cleaning steps associated with removing the loose material. This can reduce the cost associated with a glass-ceramic manufacturing process. In some embodiments, a hydroxide or an acid in a parting agent material can facilitate direct adherence and bonding of solids in the material with the surface of the glass article.

When dried, the parting agent material can be directly adhered and bonded to the surface of the glass article on which it is coated. The dried parting agent can also physically and chemically separate the surface of the glass article from an adjacent glass article surface or the surface of a setter plate. In particular embodiments, the dried parting agent material can be directly adhered and bonded to only the glass surface on which it is coated. The dried parting agent materials described herein are capable of resisting bonding to an adjacent glass article or setter plate surface during a ceramming cycle. This lack of bonding can facilitate the de-stacking of glass-ceramic articles after a ceramming cycle.

In some embodiments, a parting agent material can comprise only atomic elements that are also present in the glass composition of the glass articles in a glass stack. In such embodiments, the parting agent material may not add atomic elements to finishing waste streams during polishing of a glass-ceramic article in preparation for final product use.

Conventional parting agents on the market are typically classified in the following categories with the following characteristics. Parting agent materials described herein avoid or reduce the detrimental features of these conventional parting agents.

Category 1: Powders, which can be organic or inorganic. Organic powders include an organic that burns off during thermal processing and causes sticking and/or production of VOCs. Inorganic powders typically leave a powder residue that must be cleaned off the product after a ceramming cycle. An exemplary powder is hexagonal boron nitride powder, which leaves a powder residue. U.S. Pat. No. 4,855,000 to Gordon describes an exemplary hexagonal nitride powder.

Category 2: Greases and oils. These materials are ineffective at the high temperatures required for a glass-ceramic manufacturing method. U.S. Pat. No. 9,334,461 to Wirtensohn et al. describes an exemplary grease.

Category 3: Ceramic sheets, fiber sheets, foils, and papers. Foil materials typically burn off, releasing VOCs. The thickness variability of these materials is also difficult to control, which can lead to unacceptable warp in stacked glass-ceramic articles. U.S. Pat. No. 5,053,107 to Barber, Jr. describes an exemplary inorganic paper including glass and ceramic fibers. U.S. Pat. No. 5,145,811 to Lintz et al. describes an exemplary inorganic ceramic paper.

Category 4: Interleaves. These materials are ineffective at the high temperatures required for a glass-ceramic manufacturing method. U.S. Pat. No. 7,108,889 to Bohland describes an exemplary interleave.

Category 5: Boron nitride- and boron-containing slurries. These slurries can oxidize during a ceramming process. These slurries can also lower the liquidous phase temperature of a glass article at the surface of the glass article where higher free silicon atoms are present. This can cause roughening and/or adhesion between the glass article and an adjacent glass article or setter plate during a high temperature ceramming cycle (for example, ceramming temperatures above 750° C.).

U.S. Pat. No. 7,598,210 to Olliges describes an exemplary lubricant slurry including boron nitride.

Parting agent materials described in the present disclosure can have one or more of the following attributes. (1) A slurry with surface chemistry that enables it to interact and directly adhere and bond with only the surface on which it is coated, thus making it act like an interleave while enabling slurry application processes (for example, spray coating processes). (2) Agglomerate particles having a particle size in a range tailored to create a physical separation between adjacent articles in a glass stack while not facilitating the formation of defects during a ceramming cycle. (3) Ultrathin and uniform coating properties that enable cost advantages and improved glass-ceramic article attributes. (4) Suitable adhesion prevention characteristics that can reduce or eliminate warp of articles within a glass stack, which can improve yield. (5) An environmentally friendly composition that reduces hazardous material waste streams and reduces costs. (6) A composition that includes only atomic elements that are also present in the glass composition of glass articles within a glass stack, thereby not introducing foreign material into a finishing waste stream for a glass-ceramic manufacturing method. (7) A material that directly adheres and bonds with the surface of a glass article on which it is coated and forms a coating layer that is easily removed during finishing and avoids or reduces post-ceramming cleaning steps.

FIG. 1 illustrates a coated glass article 100 according to some embodiments. Coated glass article 100 includes a glass article 110 having a first surface 112 and a second surface 114 opposite the first surface 112. In some embodiments, first surface 112 of glass article 110 can be a "top surface" of glass article 110 and second surface 114 of glass article 110 can be a "bottom surface" of glass article 110. In some embodiments, first surface 112 of glass article 110 can be a "bottom surface" of glass article 110 and second surface 114 of glass article 110 can be a "top surface" of glass article 110. As used herein, "top" and "bottom" are the top and bottom features of a glass article as they are oriented in a glass stack during a ceramming cycle.

A parting agent 120 is coated on one or more surfaces of glass article 110. In some embodiments, parting agent 120 can be coated on first surface 112 of glass article 110. In some embodiments, parting agent 120 can be coated on second surface 114 of glass article 110. In some embodiments, parting agent 120 can be coated on first surface 112 of glass article 110 and on second surface 114 of glass article 110. In some embodiments, parting agent 120 can be coated on first surface 112 of glass article and not on second surface 114 of glass article 110. In some embodiments, parting agent 120 can be coated on only first surface 112 of glass article 110. In some embodiments, parting agent 120 can be coated on second surface 114 of glass article and not on first surface 112 of glass article 110. In some embodiments, parting agent 120 can be coated on only second surface 114 of glass article 110.

To coat one or more surfaces of glass article 110 with parting agent 120, a parting agent slurry is formed and the slurry is applied to the one or more surfaces of glass article 110. Before drying, the composition of parting agent 120 coated on one or more surfaces of glass article 110 is the same as the composition of the parting agent slurry. In other words, parting agent 120 is parting agent slurry coated on the one or more surfaces of glass article. After drying, parting agent 120 defines a dried parting agent layer (for example, parting layer 220) as described herein.

Parting agent 120, or the parting agent slurry used in coating parting agent 120, comprises an aqueous dispersion comprising silicon dioxide (silica). In some embodiments, parting agent 120, or the parting agent slurry, can comprise an aqueous dispersion comprising silicon dioxide particles. In some embodiments, parting agent 120, or the parting agent slurry, can comprise an aqueous dispersion comprising silicon dioxide agglomerate particles. In some embodiments, parting agent 120, or the parting agent slurry, can comprise an aqueous dispersion comprising amorphous silicon dioxide agglomerate particles. In some embodiments, parting agent 120, or the parting agent slurry, can comprise an aqueous dispersion comprising two or more of silicon dioxide particles, silicon dioxide agglomerate particles, and amorphous silicon dioxide agglomerate particles. In some embodiments, the amorphous silicon dioxide agglomerate particles can be fumed silica soot generated by a flame-hydrolysis process. An exemplary fumed silica soot is AEROSIL-OX-50 fumed silica with typical specific surface area (BET) of 35-65 square-meter per gram, available from Evonik.

In some embodiments, the silicon dioxide particles, or the silicon dioxide agglomerate particles, of the aqueous dispersion can have a mean particle size in a range of 100 nanometers (nm) to 20 microns, including subranges. For example, in some embodiments, the silicon dioxide particles, or the silicon dioxide agglomerate particles, can have a mean particle size ranging from 100 nm to 20 microns, 100 nm to 10 microns, 100 nm to 5 microns, 100 nm to 1 micron, 100 nm to 0.9 microns, 100 nm to 0.8 microns, 100 nm to 0.7 microns, 100 nm to 0.6 microns, 100 nm to 0.5 microns, 100 nm to 0.4 microns, 100 nm to 0.3 microns, 100 nm to 0.2 microns, 0.2 microns to 20 microns, 0.3 microns to 20 microns, 0.4 microns to 20 microns, 0.5 microns to 20 microns, 0.6 microns to 20 microns, 0.7 microns to 20 microns, 0.8 microns to 20 microns, 0.9 microns to 20 microns, 1 micron to 20 microns, 5 microns to 20 microns, or 10 microns to 20 microns, or within a range having any two of these values as endpoints, inclusive of the endpoints.

In some embodiments, the amorphous silicon dioxide agglomerate particles of the aqueous dispersion can have a mean particle size in a range of 100 nm to 20 microns, including subranges. For example, in some embodiments, the amorphous silicon dioxide agglomerate particles can have a mean particle size ranging from 100 nm to 20 microns, 100 nm to 10 microns, 100 nm to 5 microns, 100 nm to 1 micron, 100 nm to 0.9 microns, 100 nm to 0.8 microns, 100 nm to 0.7 microns, 100 nm to 0.6 microns, 100 nm to 0.5 microns, 100 nm to 0.4 microns, 100 nm to 0.3 microns, 100 nm to 0.2 microns, 0.2 microns to 20 microns, 0.3 microns to 20 microns, 0.4 microns to 20 microns, 0.5 microns to 20 microns, 0.6 microns to 20 microns, 0.7 microns to 20 microns, 0.8 microns to 20 microns, 0.9 microns to 20 microns, 1 micron to 20 microns, 5 microns to 20 microns, or 10 microns to 20 microns, or within a range having any two of these values as endpoints, inclusive of the endpoints.

Figure 4:
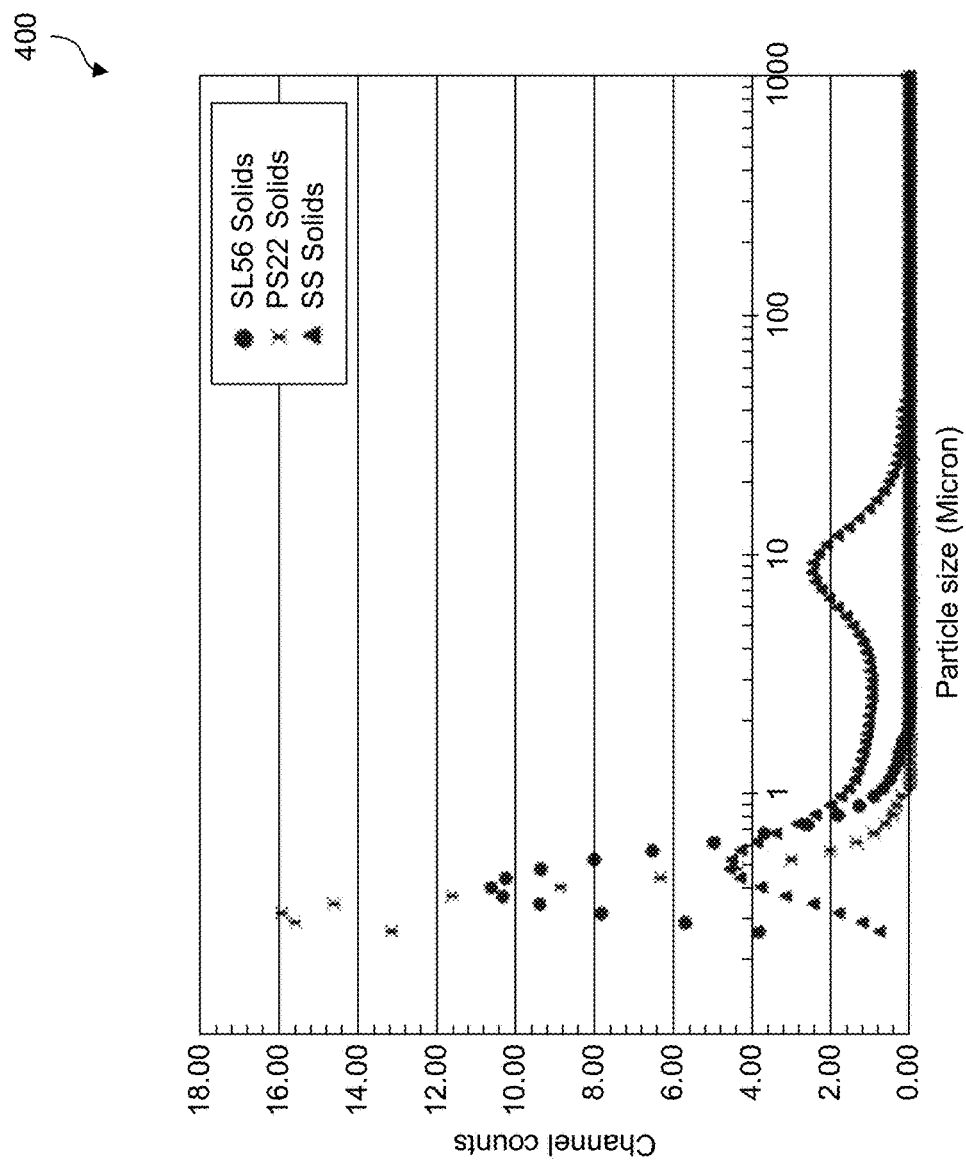
FIG. 4 is a particle size distribution graph for amorphous silicon dioxide agglomerate particles according to some embodiments compared to two other commercial silicon dioxide particles.

Graph 400 in FIG. 4 shows the particle size distribution for amorphous silicon dioxide agglomerate particles ("SL56 Solids") according to some embodiments. Unless otherwise specified, a "mean particle size" value described herein is measured by ASTM-D4464-15 ("Standard Test Method for Particle Size Distribution of Catalytic Materials by Laser Light Scattering").

Any of the mean particle size ranges described herein can reduce surface roughness of a parting layer and can facilitate the formation of thin and uniform parting layers. Mean particles sizes smaller than 100 nm were found to inadequately prevent adhesion between adjacent glass articles in a glass stack. Mean particle sizes greater than 20 microns were found to be difficult to apply in a uniform fashion. For example, mean particle sizes greater than 20 microns were difficult to apply by spray coating process and contributed to increased roughness of a parting layer and/or dimples on a glass-ceramic article.

In some embodiments, parting agent 120, or the parting agent slurry, can comprise 10 wt % or more silicon dioxide particles, or silicon dioxide agglomerate particles. In some embodiments, the weight percent of the silicon dioxide particles or the silicon dioxide agglomerate particles in parting agent 120, or the parting agent slurry, can range from 10 wt % to 30 wt %, including subranges. For example, in some embodiments, the weight percent of the silicon dioxide particles or the silicon dioxide agglomerate particles in parting agent 120, or the parting agent slurry, can range from 10 wt % to 30 wt %, 10 wt % to 27.5 wt %, 10 wt % to 25 wt %, 10 wt % to 22.5 wt %, 10 wt % to 20 wt %, 10 wt % to 17.5 wt %, 10 wt % to 15 wt %, 10 wt % to 12.5 wt %, 12.5 wt % to 30 wt %, 15 wt % to 30 wt %, 17.5 wt % to 30 wt %, 20 wt % to 30 wt %, 22.5 wt % to 30 wt %, 25 wt % to 30 wt %, or 27.5 wt % to 30 wt %, or within a range having any two of these values as endpoints, inclusive of the endpoints. In some embodiments, the weight percent of the silicon dioxide particles or the silicon dioxide agglomerate particles in parting agent 120, or the parting agent slurry, can range from 15 wt % to 25 wt %. In some embodiments, the weight percent of the silicon dioxide particles or the silicon dioxide agglomerate particles in parting agent 120, or the parting agent slurry, can range from 1 wt % to 30 wt %. The wt % of the silicon dioxide particles or the silicon dioxide agglomerate particles is the weight percent of the particles in parting agent 120 or parting agent slurry, based on total weight of parting agent 120 or the parting agent slurry.

In some embodiments, parting agent 120, or the parting agent slurry, can comprise 10 wt % or more amorphous silicon dioxide agglomerate particles. In some embodiments, the weight percent of the amorphous silicon dioxide agglomerate particles in parting agent 120, or the parting agent slurry, can range from 10 wt % to 30 wt %, including subranges. For example, in some embodiments, the weight percent of the amorphous silicon dioxide agglomerate particles in parting agent 120, or the parting agent slurry, can range from 10 wt % to 30 wt %, 10 wt % to 27.5 wt %, 10 wt % to 25 wt %, 10 wt % to 22.5 wt %, 10 wt % to 20 wt %, 10 wt % to 17.5 wt %, 10 wt % to 15 wt %, 10 wt % to 12.5 wt %, 12.5 wt % to 30 wt %, 15 wt % to 30 wt %, 17.5 wt % to 30 wt %, 20 wt % to 30 wt %, 22.5 wt % to 30 wt %, 25 wt % to 30 wt %, or 27.5 wt % to 30 wt %, or within a range having any two of these values as endpoints, inclusive of the endpoints. In some embodiments, the weight percent of the amorphous silicon dioxide agglomerate particles in parting agent 120, or the parting agent slurry, can range from 15 wt % to 25 wt %. In some embodiments, the weight percent of the amorphous silicon dioxide agglomerate particles in parting agent 120, or the parting agent slurry, can range from 1 wt % to 30 wt %. The wt % of the amorphous silicon dioxide agglomerate particles is the weight percent of the particles in parting agent 120 or parting agent slurry, based on total weight of parting agent 120 or the parting agent slurry.

In some embodiments, parting agent 120, or the parting agent slurry, can comprise a dispersant. In some embodiments, the dispersant comprises one or more hydroxides, one or more acids, or a combination thereof. In some embodiments, the hydroxide can be, but is not limited to, sodium hydroxide, ammonium hydroxide, potassium hydroxide, lithium hydroxide, or an alkaline earth hydroxide. Example alkaline earth hydroxides include calcium hydroxide ($Ca(OH)_2$) and magnesium hydroxide ($Mg(OH)_2$). In some embodiments, the acid can be, but is not limited to, an inorganic acid, for example nitric acid or phosphoric acid, an organic acid, for example, citric acid.

In some embodiments, parting agent 120, or the parting agent slurry, can comprise 0.25 wt % to 2 wt % of dispersant, including subranges. For example, in some embodiments, parting agent 120, or the parting agent slurry, can comprise dispersant in an amount ranging from 0.25 wt % to 2 wt %, 0.25 wt % to 1.75 wt %, 0.25 wt % to 1.5 wt %, 0.25 wt % to 1 wt %, 0.25 wt % to 0.75 wt %, 0.25 wt % to 0.5 wt %, 0.5 wt % to 2 wt %, 0.75 wt % to 2 wt %, 1 wt % to 2 wt %, 1.25 wt % to 2 wt %, 1.5 wt % to 2 wt %, or 1.75 wt % to 2 wt %, or within a range having any two of these values as endpoints, inclusive of the endpoints. In some embodiments, parting agent 120, or the parting agent slurry, can comprise 0.25 wt % to 1 wt % of dispersant.

The weight percent of dispersant in parting agent 120 on glass article 110, or the parting agent slurry, is calculated based on a wt % of the dispersant compound(s) (for example, NaOH) in parting agent 120 or the parting agent slurry, based on total weight of parting agent 120 or the parting agent slurry. As a non-limiting example, for a parting agent slurry having 0.15 gram NaOH, 30 grams silica soot, and 118 grams water, the wt % of NaOH is 0.1 wt %. In some embodiments, the dispersant(s) can be present in a colloidal inorganic binding agent added to the parting agent slurry.

In some embodiments, the sum of the amount of water, dispersant, and silicon dioxide, silicon dioxide agglomerate, and/or amorphous silicon dioxide agglomerate particles in parting agent 120, or the parting agent slurry, can be 90 wt % or more. For example, in some embodiments, the sum of the amount of water, dispersant, and silicon dioxide, silicon dioxide agglomerate, and/or amorphous silicon dioxide agglomerate particles can range from 90 wt % to 100 wt %, 92 wt % to 100 wt %, 94 wt % to 100 wt %, 96 wt % to 100 wt %, or 98 wt % to 100 wt %.

In embodiments including the dispersant, the dispersant can adhere the silicon dioxide particles, the silicon dioxide agglomerate particles, and/or the amorphous silicon dioxide agglomerate particles in parting agent 120 to the one or more surfaces of glass article 110 on which parting agent 120 is coated. In some embodiments, the dispersant can facilitate the formation of a direct bond between the particles and the one or more surfaces of glass article 100. In such embodiments, the direct bond can be created during a ceramming cycle. In some embodiments, the direct bond can be a covalent bond. In such embodiments, the covalent bond can be created by forming Si—O—Si or Si—O—Al bonds during a ceramming cycle.

In some embodiments, parting agent 120, or the parting agent slurry, can comprise a colloidal inorganic binding agent. In some embodiments, the colloidal inorganic binding agent can comprise a colloidal oxide. As used herein, a "colloidal" oxide, for example colloidal silicon dioxide, means a solution of charged oxide particles that are dispersed and insoluble in the solution. The degree of coagulation of oxide particles in a "colloidal" solution is sensitive to a pH change of the solution. A non-colloidal oxide particle does not have a native charge like a colloidal oxide particle. Coagulation of particles in a non-colloidal oxide particle solution is not sensitive to a pH change of the solution. The silicon dioxide particles, silicon dioxide agglomerate particles, and/or amorphous silicon dioxide particles of parting agent 120, or the parting agent slurry, may not be colloidal particles.

In some embodiments, the colloidal oxide can be, but is not limited to, colloidal silicon dioxide, colloidal aluminum oxide, colloidal zirconium oxide, colloidal titanium oxide, colloidal tin oxide, or a combination thereof. In some embodiments, the colloidal oxide can be acid dispersed. In some embodiments, the colloidal oxide can be based dispersed.

In some embodiments, the colloidal oxide can be colloidal silicon dioxide particles. For example, the colloidal silicon oxide particles can be NEXSIL™ 8 Colloidal Silica manufactured by Nyacol Nano Technologies, Inc. In some embodiments, the colloidal aluminum oxide can be colloidal aluminum oxide particles. In some embodiments, the colloidal aluminum oxide particles can be NYACOL® Colloidal Alumina manufactured by Nyacol Nano Technologies, Inc, for example NYACOL® AL20. In some embodiments, the colloidal oxide can be colloidal zirconium oxide particles. In some embodiments, the colloidal zirconium oxide particles can be NYACOL® Colloidal Zirconia manufactured by Nyacol Nano Technologies, Inc. In some embodiments, the colloidal oxide can be colloidal titanium oxide particles. In some embodiments, the colloidal titanium oxide particles can be NYACOL® Colloidal Titanium Dioxide manufactured by Nyacol Nano Technologies, Inc. In some embodiments, the colloidal oxide can be colloidal tin oxide particles. In some embodiments, the colloidal tin oxide particles can be NYACOL® Colloidal Tin Oxide manufactured by Nyacol Nano Technologies, Inc.

In some embodiments, parting agent 120, or the parting agent slurry, can comprise 1 wt % to 10 wt % colloidal inorganic binding agent, including subranges. For example, in some embodiments, parting agent 120, or the parting agent slurry, can comprise colloidal inorganic binding agent in an amount ranging from 1 wt % to 10 wt %, 1 wt % to 8 wt %, 1 wt % to 6 wt %, 1 wt % to 4 wt %, 1 wt % to 2 wt %, 2 wt % to 10 wt %, 4 wt % to 10 wt %, 6 wt % to 10 wt %, or 8 wt % to 10 wt %, or within a range having any two of these values as endpoints, inclusive of the endpoints. In some embodiments, parting agent 120, or the parting agent slurry, can comprise colloidal inorganic binding agent in an amount ranging from 4 wt % to 6 wt %. The wt % of colloidal inorganic binding agent is the weight of solids in the colloidal inorganic binding agent solution(s) of parting agent 120 or parting agent slurry, based on total weight of the parting agent 120 or parting agent slurry. As a non-limiting example, for a parting agent slurry composed of 22 grams of NEXSIL™ 8 (colloidal silica solution), 20 grams of AEROSIL-OX-50 (amorphous silica soot powder), 0.15 gram NaOH, and 91 grams of de-ionized water, the weight percent of colloidal silica solution is 5 wt % (NEXSIL™ 8 is 30 wt % solids). In this example, the parting agent slurry has a total solids content of 20 wt % (15 wt % of silica soot powder and 5 wt % solids from the colloidal silica solution).

In some embodiments, parting agent 120, or the parting agent slurry, can comprise a total solid content in a range of 10 wt % to 40 wt %, including subranges. For example, in some embodiments, the total solid content can range from 10 wt % to 40 wt %, 10 wt % to 35 wt %, 10 wt % to 30 wt %, 10 wt % to 25 wt %, 10 wt % to 20 wt %, 10 wt % to 15 wt %, 15 wt % to 40 wt %, 20 wt % to 40 wt %, 25 wt % to 40 wt %, 30 wt % to 40 wt %, or 35 wt % to 40 wt %, or within a range having any two of these values as endpoints, inclusive of the endpoints.

In embodiments including the colloidal inorganic binding agent, the colloidal inorganic binding agent can adhere the silicon dioxide particles, the silicon dioxide agglomerate particles, and/or the amorphous silicon dioxide agglomerate particles in parting agent 120 to the one or more surfaces of glass article 110 on which parting agent 120 is coated. In such embodiments, after drying parting agent 120 to form parting layer 220, colloidal inorganic oxide(s) of the colloidal inorganic binding agent can hold the place between the particles, and can adhere the particles to the one or more surfaces of glass article 110. In some embodiments, the colloidal inorganic binding agent can facilitate the formation of a direct bond between the particles and the one or more surfaces of glass article 100. In such embodiments, the direct bond can be created during a ceramming cycle. After a ceramming cycle, the colloidal inorganic oxide(s) of the colloidal inorganic binding agent can form an oxygen-bridging bond with the one or more surfaces of glass article 110, and thus strongly bond parting layer 220 to the one or more surfaces. In some embodiments, the acid or base of the colloidal inorganic binding agent can facilitate the adherence and/or bonding.

In some embodiments, the sum of the amount of water, dispersant, colloidal inorganic binding agent, and silicon dioxide, silicon dioxide agglomerate, and/or amorphous silicon dioxide agglomerate particles in parting agent 120, or the parting agent slurry, can be 90 wt % or more. For example, in some embodiments, the sum of the amount of water, dispersant, colloidal inorganic binding agent, and silicon dioxide, silicon dioxide agglomerate, and/or amorphous silicon dioxide agglomerate particles can range from 90 wt % to 100 wt %, 92 wt % to 100 wt %, 94 wt % to 100 wt %, 96 wt % to 100 wt %, or 98 wt % to 100 wt %. In embodiments including colloidal inorganic binding agent, water present in the parting agent 120, or the parting agent slurry, is water added to the parting agent slurry and water in the colloidal inorganic binding agent solution added to the slurry.

In some embodiments, parting agent 120, or the parting agent slurry, can comprise a pH greater than 7. In some embodiments, parting agent 120, or the parting agent slurry, can comprise a pH ranging from 8.5 to 11, including subranges. For example, in some embodiments, parting agent 120, or the parting agent slurry, can comprise a pH ranging from 8.5 to 11, 8.5 to 10.5, 8.5 to 10, 8.5 to 9.5, 8.5 to 9, 9 to 11, 9.5 to 11, 10 to 11, or 10.5 to 11, or within a range having any two of these values as endpoints, inclusive of the end points. A pH in any of these ranges can reduce or prevent pitting or etching of a glass article's surface coated with parting agent 120. Additionally, a pH in any of these ranges can enable to use of some coating processes, for example spray coating processes, which can be sensitive to corrosive slurries.

In some embodiments, parting agent 120, or the parting agent slurry, can comprise a viscosity ranging from 5 cP (centipoise) to 160 cP, including subranges. For example, in some embodiments, parting agent 120, or the parting agent slurry, can comprise a viscosity ranging from 5 cP to 160 cP, 5 cP to 150 cP, 5 cP to 125 cP, 5 cP to 100 cP, 5 cP to 75 cP, 5 cP to 50 cP, 5 cP to 25 cP, 25 cP to 160 cP, 50 cP to 160 cP, 75 cP to 160 cP, 100 cP to 160 cP, 125 cP to 160 cP, or 150 cP to 160 cP, or within a range having any two of these values as endpoints, inclusive of the endpoints. In some embodiments, parting agent 120, or the parting agent slurry, can comprise a viscosity ranging from 5 cP to 50 cP. A viscosity in any of these ranges can facilitate the formation of uniform parting agent coating. Also, a viscosity in any of these ranges can enable to use of some coating processes, for example spray coating processes.

Figure 2:
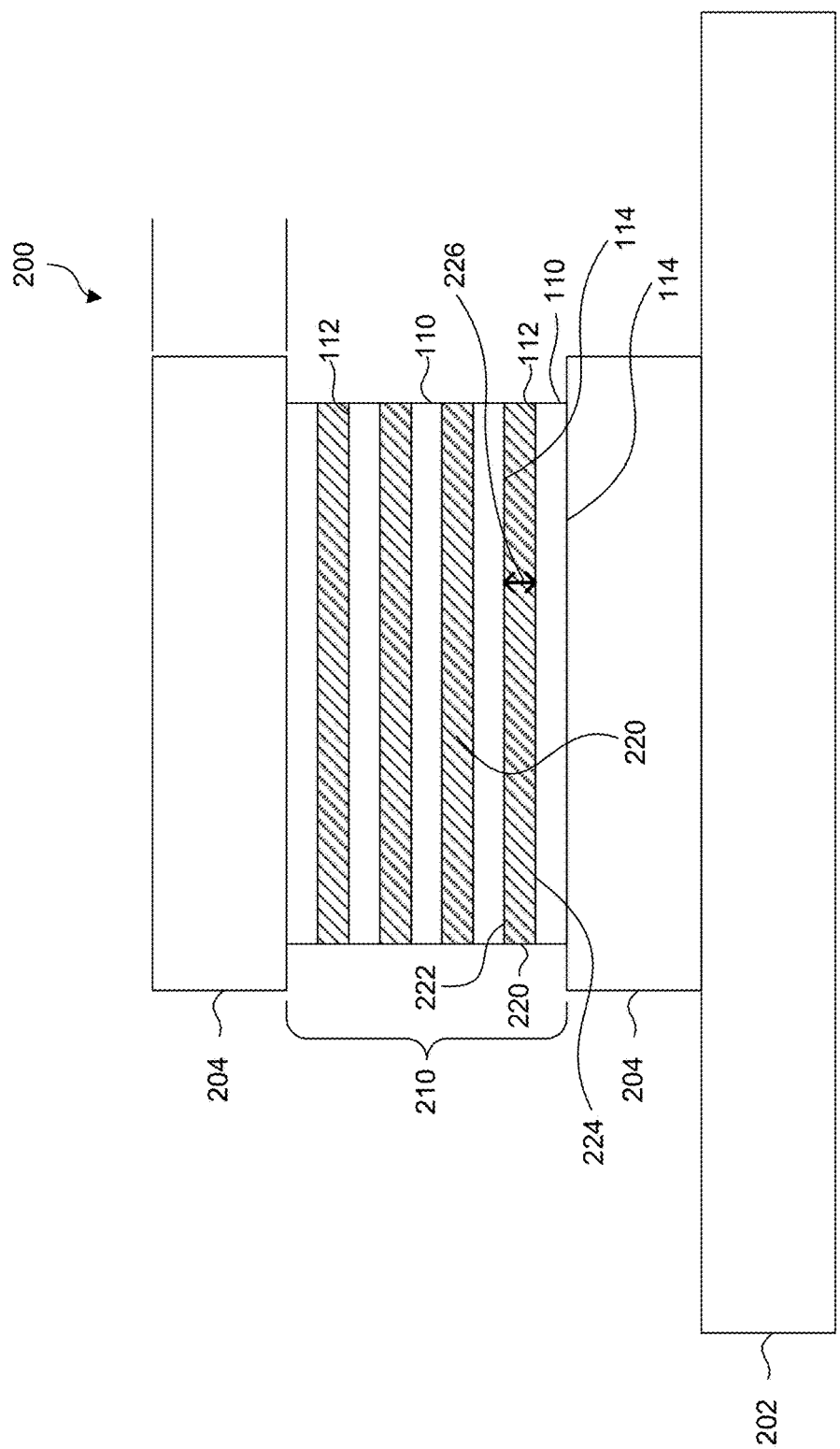
FIG. 2 illustrates a ceramming stack according to some embodiments.

After application of parting agent 120 on one or more surfaces of glass article 110, parting agent can be dried to form a parting layer (for example, a parting layer 220 as shown in FIG. 2) on the one or more surface of glass article 110. After coating and drying parting agent 120, a parting layer 220 can be directly adhered to a surface of glass article 110, for example, first surface 112 or second surface 114. As used herein, the term "directly adhered" means that the parting layer 220 is in direct contact with a surface of glass article 110 and there is a direct attachment between the material of parting layer 220 and the glass composition of glass article 110 at the surface. The direct attachment can be, for example, a hydrophilic bond between the material of parting layer 220 and the glass composition of glass article 110 at the surface.

After drying, a parting layer 220 directly adhered to a surface of glass article 110 may not directly adhere to another glass article disposed on the dried parting layer 220. Drying parting agent 120 to form a parting layer 220 can form a direct attachment between a first surface of parting layer 220 (for example, surface 222) and a surface of glass article 110, and leave a second surface of the parting layer 220 (for example, surface 224) not directly adhered to a surface of the glass article 110. When a second glass article is disposed on the second surface of the dried parting layer 220, a direct attachment is not formed between the second glass article and the second surface of the dried parting layer 220. In other words, once dried on a first glass article, parting layer 220 will not form a direct attachment with a second glass article disposed on the dried parting layer 220. Since no direct attachment is formed between the second glass article and the dried parting layer 220, a direct bond between the second glass article and the dried parting layer 220 is also not formed during a ceramming process.

During a ceramming process, parting layer 220 can become directly bonded to a surface of glass article, for example, first surface 112 or second surface 114. As used herein, the term "directly bonded" means that the parting layer 220 is in direct contact with a surface of glass article 110 and there is a direct bond between the material of parting layer 220 and the glass composition of glass article 110 at the surface. The direct bond can be, for example, a covalent bond. The direct bond can take the place of a direct attachment between the material of parting layer 220 and the glass composition of glass article 110. In other words, a ceramming process can transform a direct attachment between the material of parting layer 220 and the glass composition of glass article 110 to a direct bond between the material of parting layer 220 and the glass composition of glass article 110. As a non-limiting example, a dispersant like sodium hydroxide can form a covalent bond between particles of a parting agent with the surface of a glass article. Sodium in the sodium hydroxide can help dissolve surface silicon from 2SiOH at the surface of a glass article, forms SiO—Si bonds at the surface, and releases $H_2O$ to form a direct bond between the particles of a parting agent material and the glass composition of a glass article. Silicon dioxide alone does not have enough OH groups to create such a bond. In such embodiments, during a ceramming process, hydrophilic bonds created by sodium hydroxide can change to Si—O—Si covalent bonds between the particles of a parting agent material and the glass composition of a glass article.

Before a ceramming cycle, parting layer 220 can comprise the same solid components as parting agent 120, or the parting agent slurry. For example, parting layer 220 can comprise silicon dioxide particles, silicon dioxide agglomerate particles, and/or amorphous silicon dioxide agglomerate particles having a mean particle size in a range as described above for parting agent 120 and the parting agent slurry. In embodiments including a colloidal inorganic binding agent, parting layer 220 can comprise the colloidal inorganic binding agent as described above for parting agent 120 and the parting agent slurry.

In some embodiments, parting layer 220 can comprise a mean coating thickness 226, measured from a first surface 222 to a second surface 224 parting layer 220, of 1 micron to 5 microns, including subranges. For example, in some embodiments, mean coating thickness 226 can range from 1 micron to 5 microns, 1 micron to 4.5 microns, 1 micron to 4 microns, 1 micron to 3.5 microns, 1 micron to 3 microns, 1 micron to 2.5 microns, 1 micron to 2 microns, 1 micron to 1.5 microns, 1.5 microns to 5 microns, 2 microns to 5 microns, 2.5 microns to 5 microns, 3 microns to 5 microns, 3.5 microns to 5 microns, 4 microns to 5 microns, or 4.5 microns to 5 microns, or within a range having any two of these values as endpoints, inclusive of the endpoints. In some embodiments, mean coating thickness 226 can range from 1 micron to 3 microns.

Figure 5A:
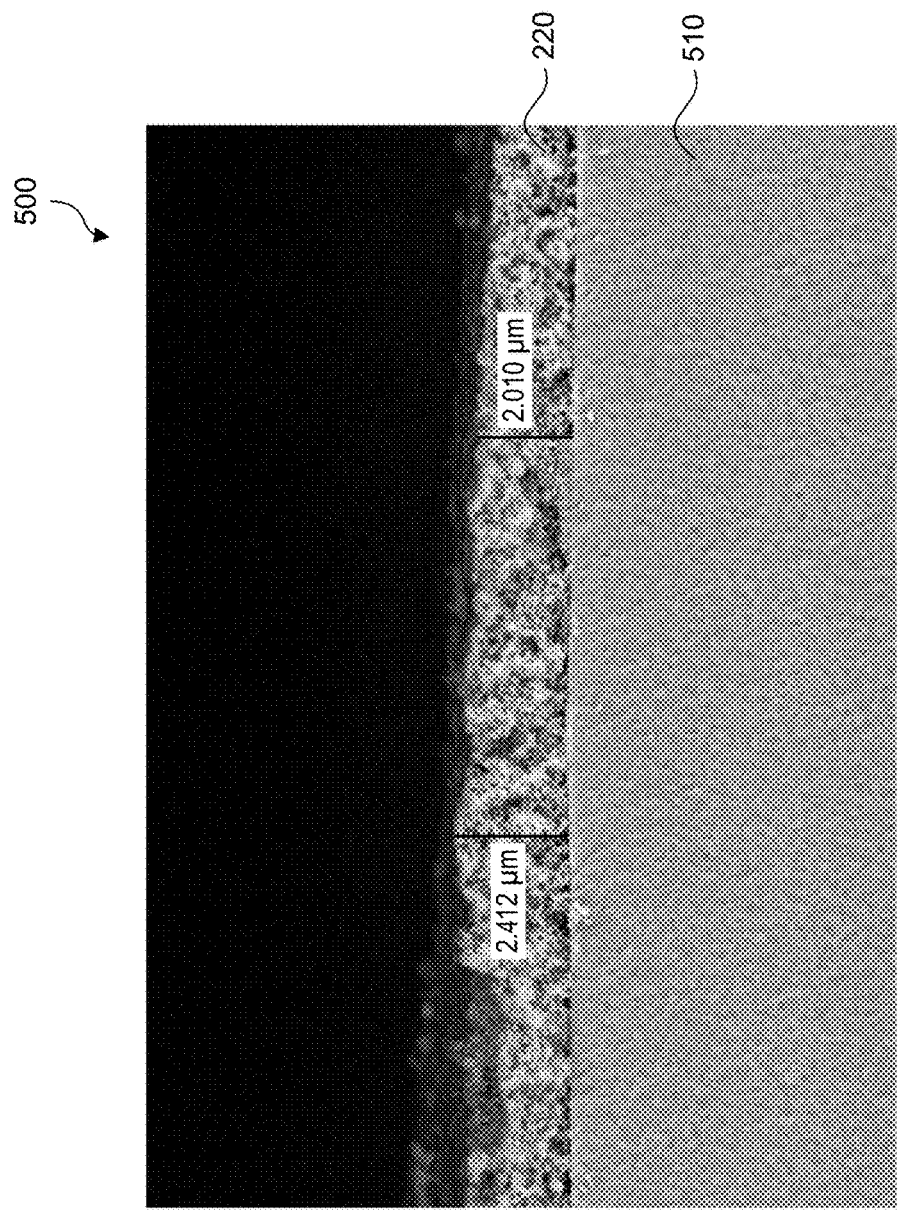
FIG. 5A is a scanning electron microscope (SEM) image of a parting layer on a glass-ceramic article according to some embodiments.

Image 500 in FIG. 5A shows a parting layer 220 on a glass-ceramic article 510 according to some embodiments. The parting layer 220 in FIG. 5A was spray coated on a glass article 110 using a slurry having the following composition: 22 grams of NEXSIL™ 8 (colloidal silica solution), 20 grams of AEROSIL-OX-50 (amorphous silica soot powder), 0.15 gram NaOH (from NEXSIL™ 8), and 91 grams of de-ionized water (i.e., composition "SL56" in Table 1). The slurry had a total of 20 wt % solid content (5 wt % colloidal silica solution and 15 wt % silica soot), 0.1 wt % NaOH, a pH of 9, and a milky consistency. The coated glass article 110 was subject to a ceramming cycle as follows. First, a nucleation phase at 580° C. for 2.5 hours. Second, a crystallization phase at 755° C. for 0.75 hours. As shown in FIG. 5A, after the ceramming cycle, the parting layer 220 on the glass-ceramic article 510 had a mean coating thickness of less than 3 microns.

Figure 5B:
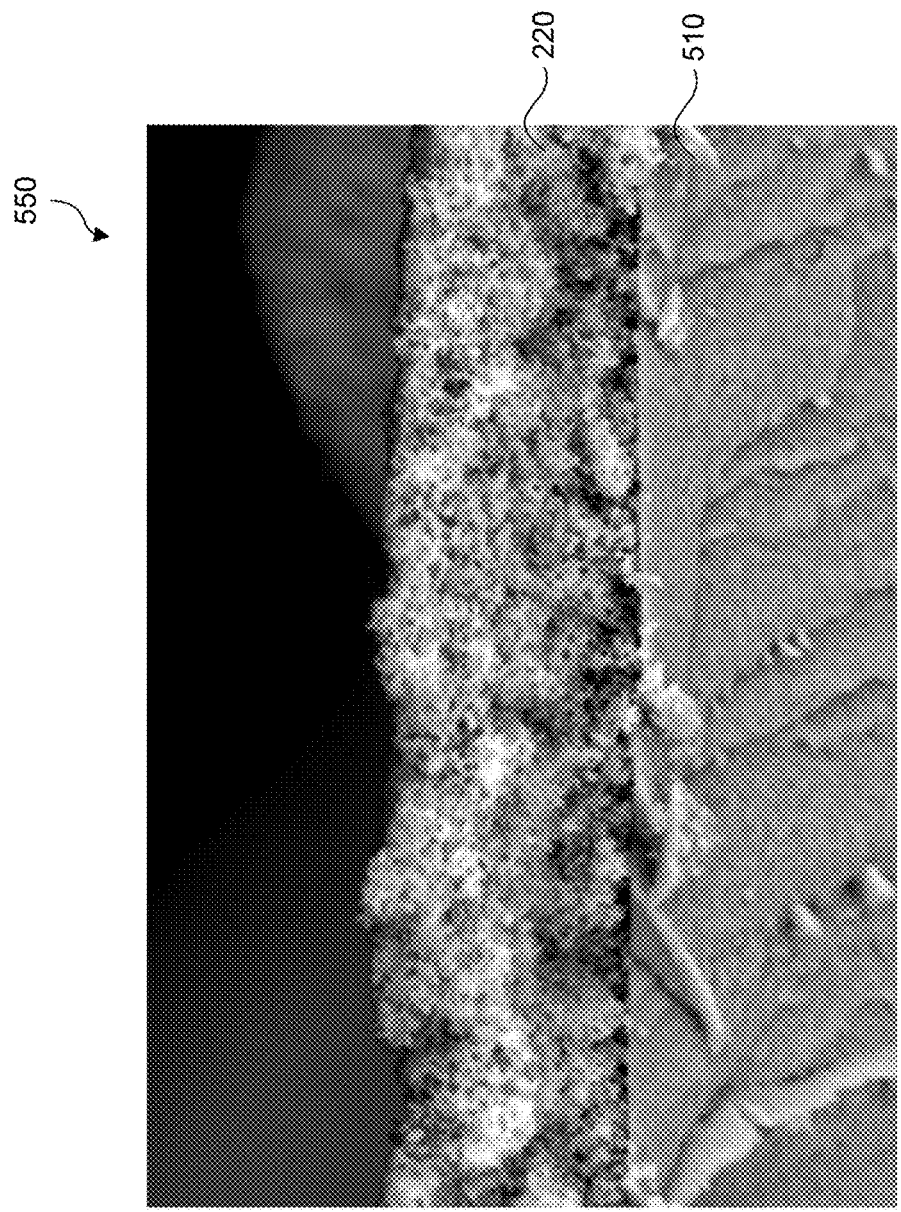
FIG. 5B is a scanning electron microscope (SEM) image of a parting layer on a glass-ceramic article according to some embodiments.

Image 550 in FIG. 5B shows a parting layer 220 on a glass-ceramic article 510 according to some embodiments. The parting layer 220 in FIG. 5B was spray coated on a glass article 110 using a slurry having the following composition: 20 wt % AEROSIL-OX-50, 0.1 wt % NaOH, and the remainder DI water (i.e., composition "SL63" in Table 1). The coated glass article 110 was subject to a ceramming cycle as follows. First, a nucleation phase at 580° C. for 2.5 hours. Second, a crystallization phase at 755° C. for 0.75 hours. After the ceramming cycle, the parting layer 220 on the glass-ceramic article 510 had a mean coating thickness of less than 3 microns.

Figure 6A:
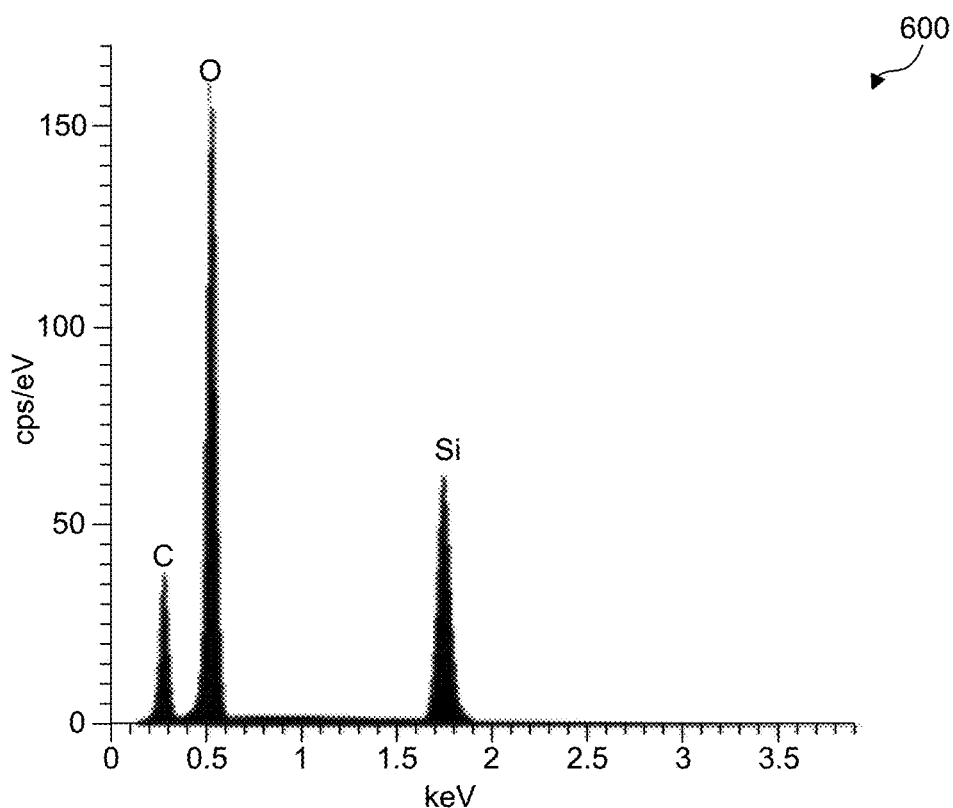
FIG. 6A is an energy dispersive X-ray (EDX) analysis of the parting layer in FIG. 5.
Figure 6B:
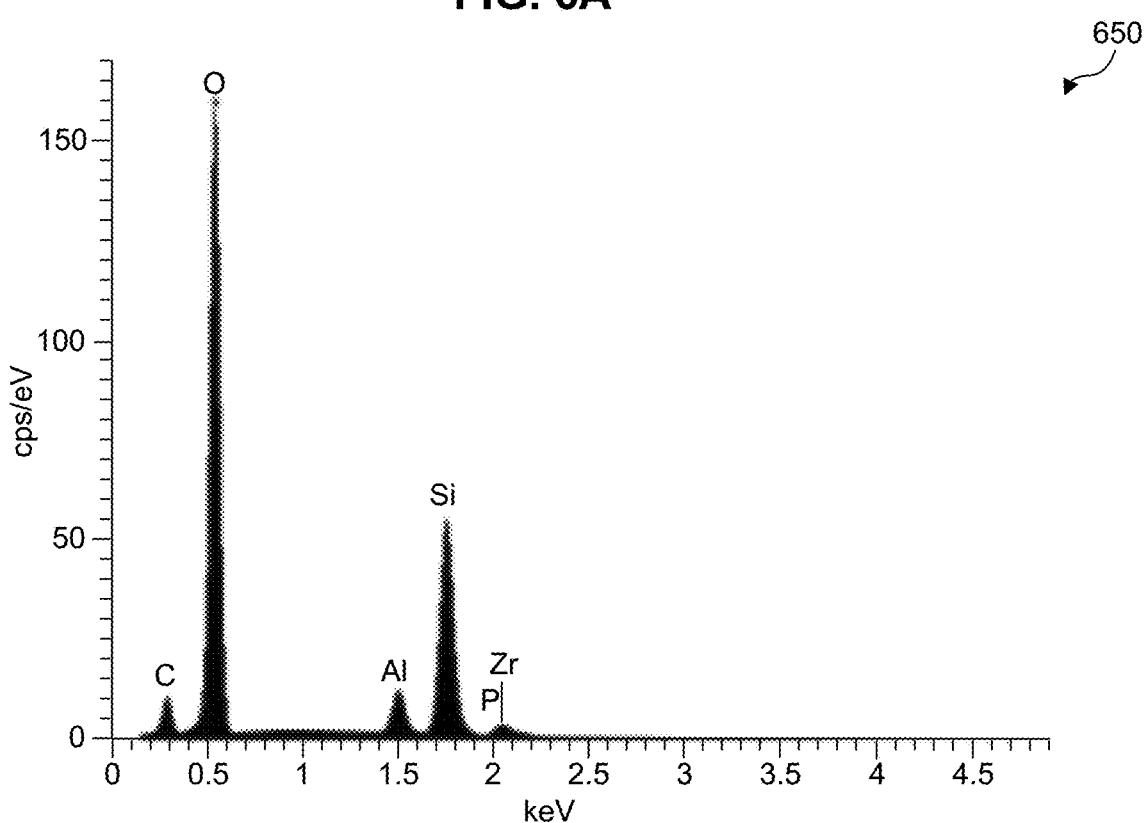
FIG. 6B is an energy dispersive X-ray (EDX) analysis of the glass-ceramic article in FIG. 5.

In some embodiments, parting layer 220 can comprise only atomic elements that are also present in the glass composition of the glass articles, and thus cerammed glass-ceramic articles, in a glass stack. Graphs 600 and 650 in FIGS. 6A and 6B show the elemental similarity between the glass-ceramic composition of the glass-ceramic article 510 and the parting layer 220 in FIG. 5. Graph 600 shows energy dispersive X-ray (EDX) analysis results for the parting layer 220. Graph 650 shows EDX analysis results of the glass-ceramic article 510. The similarity between the peaks in graphs 600 and 650 illustrates compositional similarity between the glass-ceramic article 510 and the parting layer 220.

Figure 7:
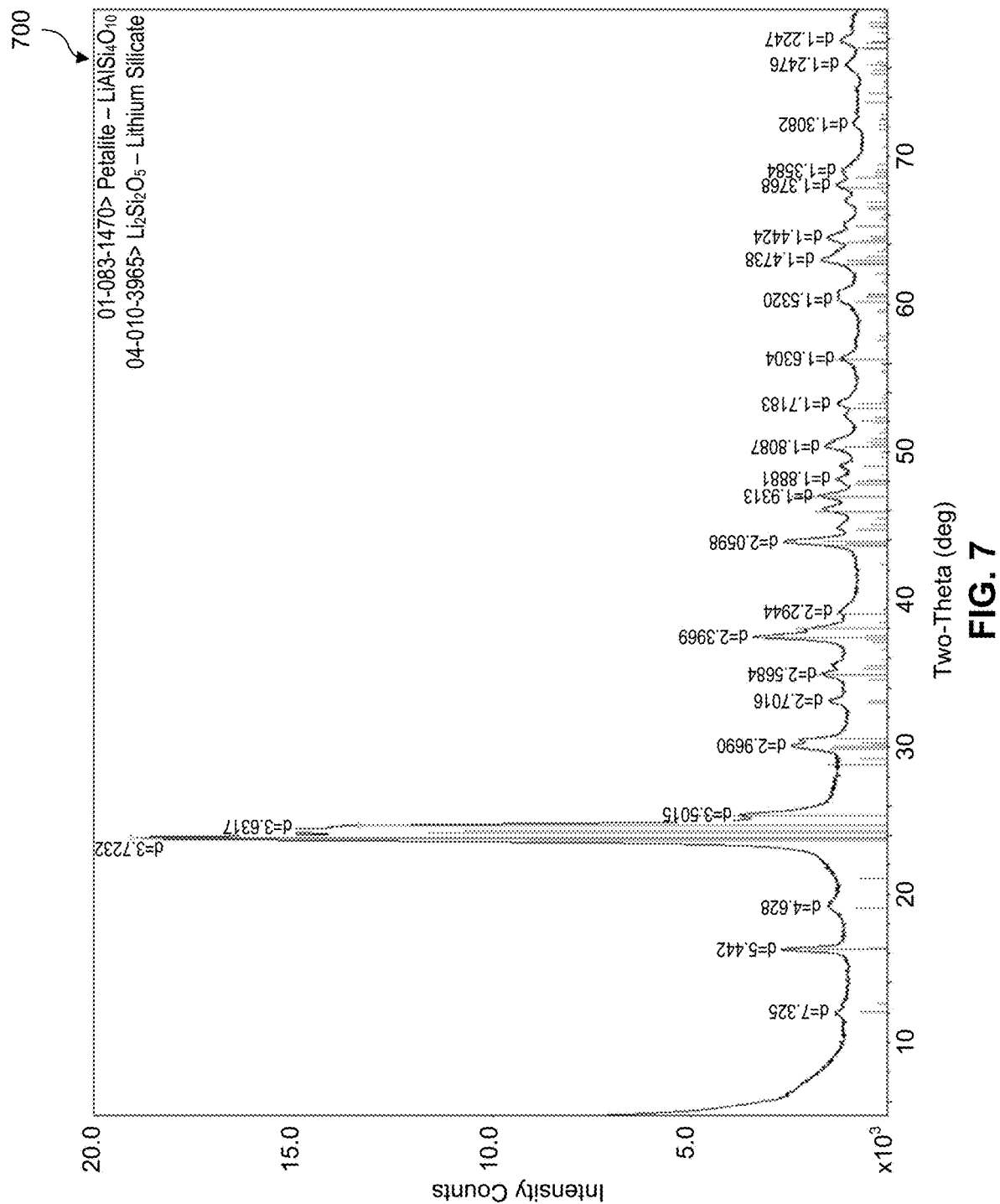
FIG. 7 is an X-ray diffraction (XRD) and Rietveld analysis showing the phase assemblage in the glass-ceramic article in FIG. 5.
Figure 8:
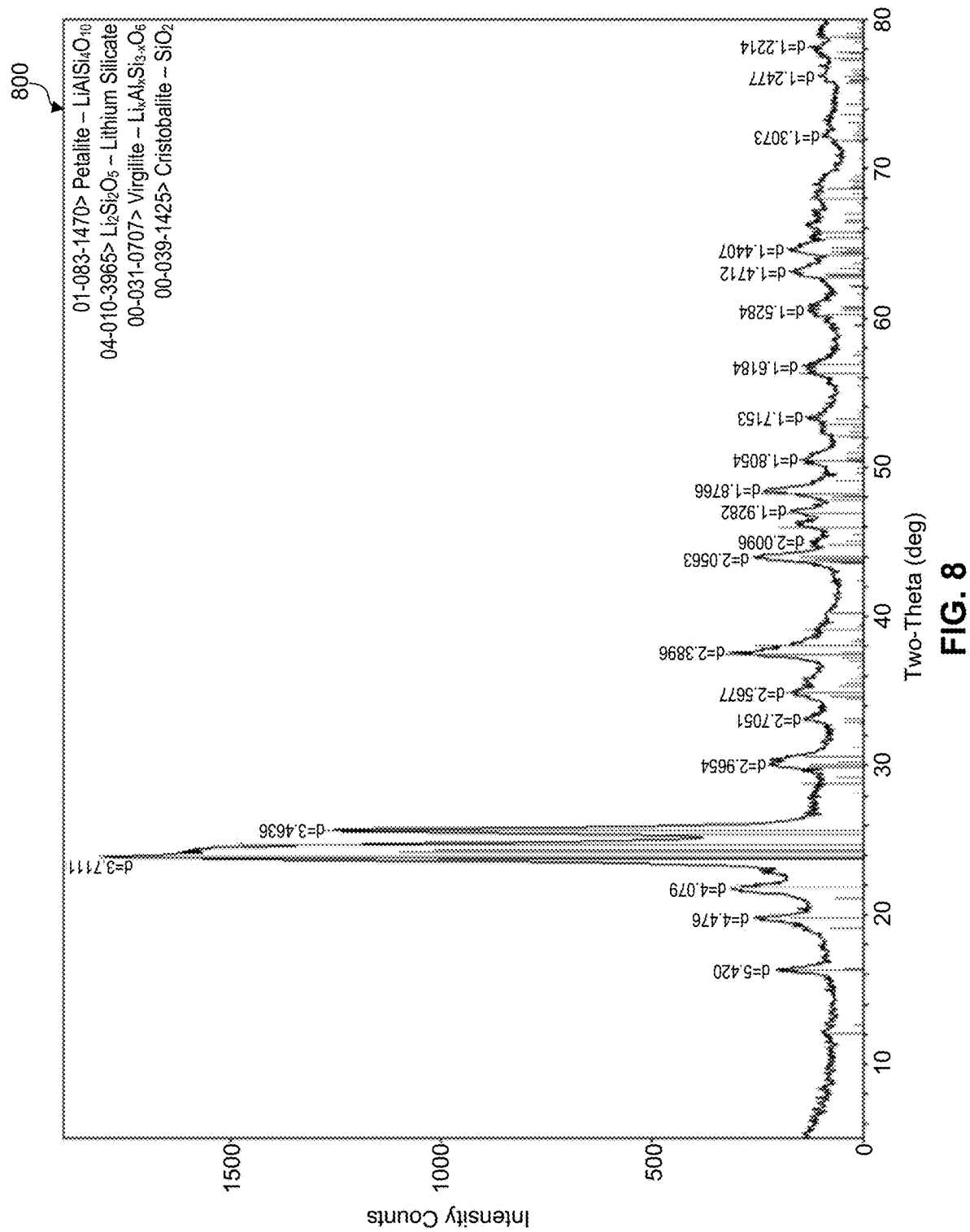
FIG. 8 is a surface grazing incidence X-ray diffraction (GIXRD) analysis at grazing angle with surface interaction only showing the phase assemblage in the glass-ceramic article in FIG. 5.

Graphs 700 and 800 in FIGS. 7 and 8 illustrate the lack of reactivity between the glass-ceramic composition of the glass-ceramic article 510 and the parting layer 220 composition in FIG. 5. Graph 700 shows X-ray diffraction (XRD) and Rietveld analysis results showing the phase assemblage in glass-ceramic article 510. Graph 800 shows surface grazing incidence X-ray diffraction (GIXRD) results showing the phase assemblage in glass-ceramic article 510 and the parting layer 220. Graphs 700 and 800 illustrate that the phase assemblage of the glass-ceramic article 510 is relatively unchanged by the presence of the parting layer 220.

In some embodiments, parting layer 220 can comprise a mean dry coverage on a surface of glass article 110 of 0.5 gsm (grams per square meter) to 1.5 gsm, including subranges. For example, in some embodiments, parting layer 220 can comprise a mean dry coverage of 0.5 gsm to 1.5 gsm, 0.5 gsm to 1.25 gsm, 0.5 gsm to 1 gsm, 0.5 gsm to 0.75 gsm, 0.75 gsm to 1.5 gsm, 1 gsm to 1.5 gsm, or 1.25 gsm to 1.5 gsm, or within a range having any two of these values as endpoints, inclusive of the endpoints.

In some embodiments, parting layer 220 can comprise a thickness uniformity of +/−0.5 gsm. As used herein, a "thickness uniformity" for a coating or layer means that the dry weight per area of the coating or layer, measured in grams per square meter (gsm), does not vary by for than +/−X gsm. A "thickness uniformity" is calculated by measuring the dry weight of a coating or layer at six or more different locations on a glass surface. The six locations should be distributed across the glass surface to provide an accurate representation of the thickness of the coating or layer on the entire glass surface. In some embodiments, parting layer 220 can comprise a thickness uniformity of +/−0.4 gsm. In some embodiments, parting layer 220 can comprise a thickness uniformity of +/−0.3 gsm.

The mean coating thickness, mean dry coverage, and thickness uniformity ranges described herein are characteristics of parting layer 220 that can prevent or reduce adhesion between adjacent glass articles 110, or a glass article 110 and a setter plate, which can lead to wrapping of glass articles 110 during a ceramming cycle. Relatedly, these characteristics can prevent or reduce adhesion between adjacent cerammed glass articles, or a cerammed glass article and a setter plate, which can lead to wrapping. These characteristics can also prevent or reduce stiction between adjacent glass articles 110, or a glass article 110 and a setter plate, which can lead to wrapping of glass articles 110 during a ceramming cycle. Relatedly, these characteristics can prevent or reduce stiction between adjacent cerammed glass articles, or a cerammed glass article and a setter plate, which can lead to wrapping.

In some embodiments, the uniformity of parting layer 220 can be characterized by percent haze of a coated glass article including parting layer 220. Unless otherwise specified, percent haze is measured in accordance with ASTM D 1044 using suitable equipment, for example, a BYK Haze-Gard Plus instrument from the Paul N. Gardner Company, Inc. The Haze-Gard Plus instrument utilizes an Illuminant C light source representing average day light with a correlated color temperature of 6774 K. In some embodiments, a glass article 110 coated with a parting layer 220 can comprise a percent haze of 50% or less. For example, in some embodiments, a glass article 110 coated with a parting layer 220 comprise a percent haze of 0% to 50%, 1% to 50%, 5% to 50%, 10% to 50%, 20% to 50%, 30% to 50%, or 40% to 50%.

Figure 9:
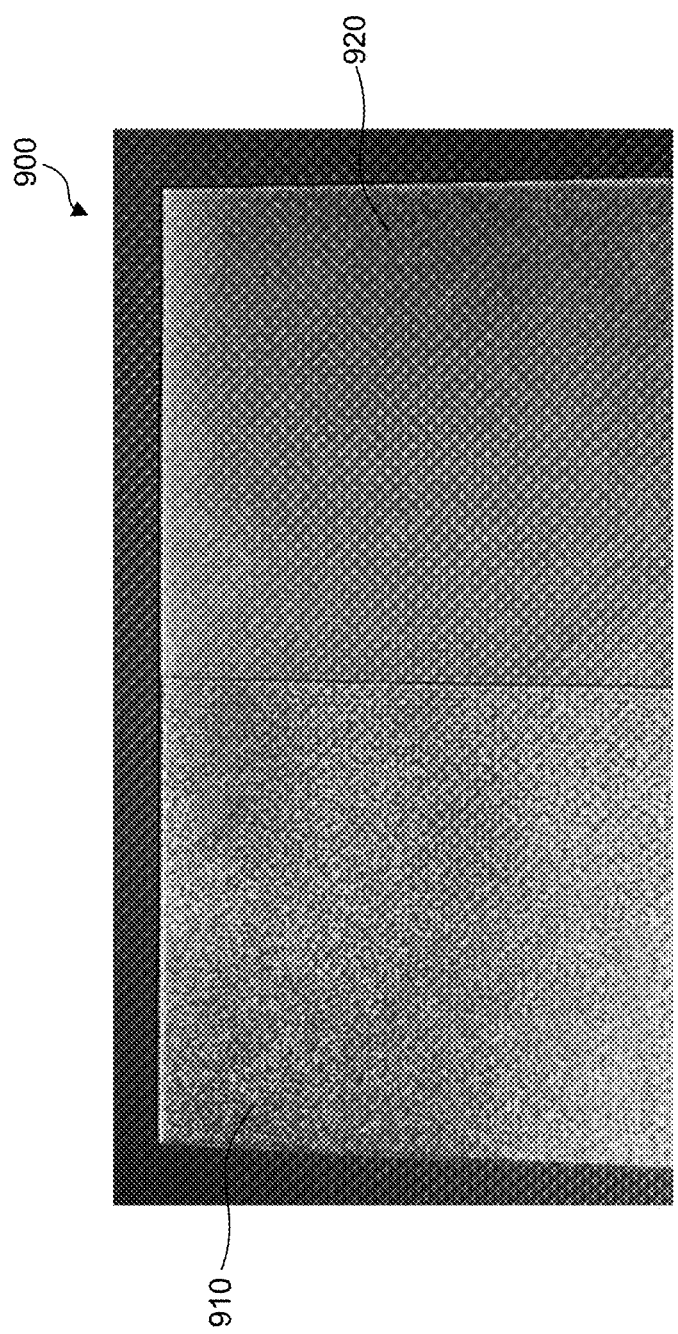
FIG. 9 is an image comparing two coated glass-ceramic articles.
Figure 10:
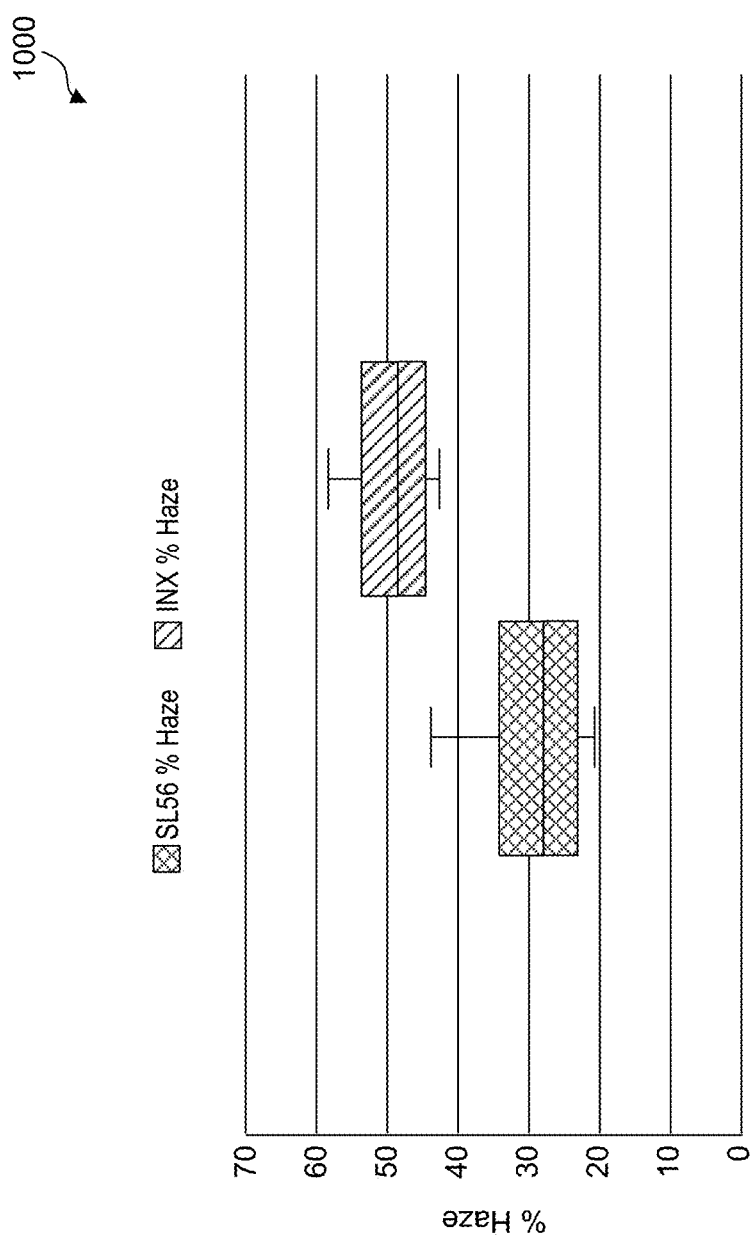
FIG. 10 is a graph comparing the percent haze of two coated glass articles.

FIGS. 9 and 10 illustrate the improved uniformity of a parting layer 220 according to some embodiments (referred to as "SL56") compared to a boron-containing parting layer (referred to as "INX"). The composition of the SL56 parting layer and the INX parting layers are shown below in Table 1.

TABLE 1

Exemplary Parting Agent Slurry Compositions

|  | INX | SL56 | SL63 |
|---|---|---|---|
| Solids | Hexagonal BN$_3$ | AEROSIL-OX-50 (15 wt %) | AEROSIL-OX-50 (20 wt %) |
| Binder | Colloidal Al$_2$O$_3$ | NEXSIL ™ 8 (5 wt %) | None |
| Dispersant | <1 wt % HNO$_3$ | None added (0.1 wt % NaOH from NEXSIL ™ 8) | 0.1 wt % NaOH |
| DI water | 76 wt % | 91 grams | 118 grams |

FIG. 9 shows an image 900 comparing a glass article 910 having one surface coated with the INX parting layer and a glass article 920 having one surface coated with the SL56 parting layer after a ceramming cycle. The patterned background behind glass article 920 is noticeably clearer than the patterned background behind glass article 910, indicating that glass article 920 has a percent haze value significantly less than glass article 910.

The graph 1000 in FIG. 10 shows percent haze measurement results for glass article 910 and glass article 920 after drying the parting agents but before the ceramming cycle. Glass article 910 had percent haze of about 48%. Glass article 920 had a percent haze of about 27%.

As illustrated, for example in FIG. 2, a plurality of glass articles 110 coated with a parting layer 220 can be positioned in a glass stack for a ceramming cycle used to ceram glass articles 110. FIG. 2 illustrates a ceramming stack 200 including a glass stack 210 and setter plates 204 according to some embodiments. Setter plates 204 can be positioned on opposing sides of glass stack 210 and can serve to support glass stack 210 during a ceramming cycle.

Glass stack 210 includes a plurality of glass articles 110. In some embodiments, glass stack 210 can include three or more glass articles 110, for example, 3 to 24 glass articles, 6 to 24 glass articles, 10 to 20 glass articles, 5 to 15 glass articles, or 6 to 10 glass articles. In some embodiments, glass articles 110 can be glass sheets. In some embodiments, glass compositions can be manufactured into glass sheets via processes, including but not limited to, slot drawing, float glass processes, rolling, and other glass sheet forming processes known to those skilled in the art.

Each glass article 110 in stack 210 can be separated from an adjacent glass article 110 by a parting layer 220 disposed between the adjacent glass articles 110. For example, glass stack 210 can include a first glass article 110 and a second glass article 110 disposed over the first surface 112 of the first glass article 110. In such embodiments, a parting layer 220 can be disposed between the first surface 112 of the first glass article 110 and a second surface 114 of the second glass article 110. And in such embodiments, a parting layer 220 disposed between the first and second glass articles 110 can be either: (i) directly adhered to the first surface 112 the first glass article 110 and in direct contact with the second surface 114 of the second glass article 110 but not adhered to the second surface 114 of the second glass article 110, or (ii) directly adhered to the second surface 114 of the second glass article 110 and in direct contact with the first surface 112 of the first glass article 110 but not adhered to the first surface 112 of the first glass article 110.

As another example, glass stack 210 can include a first glass article 110, a second glass article 110 disposed over the first surface 112 of the first glass article 110, and a third glass article 110 disposed over the first surface 112 of the second glass article 110. In such embodiments, a first parting layer 220 can be disposed between the first surface 112 of the first glass article 110 and a second surface 114 of the second glass article 110, and a second parting layer 220 can be disposed between the first surface 112 of the second glass article 110 and a second surface 114 of the third glass article 110. In such embodiments, the first parting layer 220 can be either: (i) directly adhered to the first surface 112 the first glass article 110 and in direct contact with the second surface 114 of the second glass article 110 but not adhered to the second surface 114 of the second glass article 110, or (ii) directly adhered to the second surface 114 of the second glass article 110 and in direct contact with the first surface 112 of the first glass article 110 but not adhered to the first surface 112 of the first glass article 110. And in such embodiments, the second parting layer 220 can be either: (i) directly adhered to the first surface 112 the second glass article 110 and in direct contact with the second surface 114 of the third glass article 110 but not adhered to the second surface 114 of the third glass article 110, or (ii) directly adhered to the second surface 114 of the third glass article 110 and in direct contact with the first surface 112 of the second glass article 110 but not adhered to the first surface 112 of the second glass article 110. Glass stacks 210 with more than three glass articles 110 can include additional parting layers similarly disposed between the additional glass articles 110.

After ceramming, each glass-ceramic in stack 210 can be separated from an adjacent glass-ceramic article by a parting layer 220 disposed between the adjacent glass-ceramic articles. For example, glass stack 210 can include a first glass-ceramic article and a second glass-ceramic article disposed over the first surface 112 of the first glass-ceramic article. In such embodiments, a parting layer 220 can be disposed between the first surface 112 of the first glass-ceramic article and a second surface 114 of the second glass-ceramic article. And in such embodiments, a parting layer 220 disposed between the first and second glass-ceramic articles 110 can be either: (i) directly a to the first surface 112 the first glass-ceramic article and in direct contact with the second surface 114 of the second glass-ceramic article but not bonded to the second surface 114 of the second glass-ceramic article, or (ii) directly bonded to the second surface 114 of the second glass-ceramic article and in direct contact with the first surface 112 of the first glass-ceramic article but not bonded to the first surface 112 of the first glass-ceramic article.

As another example, after ceramming, glass stack 210 can include a first glass-ceramic article, a second glass-ceramic article disposed over the first surface 112 of the first glass-ceramic article, and a third glass-ceramic article disposed over the first surface 112 of the second glass-ceramic article. In such embodiments, a first parting layer 220 can be disposed between the first surface 112 of the first glass-ceramic article and a second surface 114 of the second glass-ceramic article, and a second parting layer 220 can be disposed between the first surface 112 of the second glass-ceramic article and a second surface 114 of the third glass-ceramic article. In such embodiments, the first parting layer 220 can be either: (i) directly bonded to the first surface 112 the first glass-ceramic article and in direct contact with the second surface 114 of the second glass-ceramic article but not bonded to the second surface 114 of the second glass-ceramic article, or (ii) directly bonded to the second surface 114 of the second glass-ceramic article and in direct contact with the first surface 112 of the first glass-ceramic article but not bonded to the first surface 112 of the first glass-ceramic article. And in such embodiments, the second parting layer 220 can be either: (i) directly bonded to the first surface 112 the second glass-ceramic article and in direct contact with the second surface 114 of the third glass-ceramic article but not bonded to the second surface 114 of the third glass-ceramic article, or (ii) directly bonded to the second surface 114 of the third glass-ceramic article and in direct contact with the first surface 112 of the second glass-ceramic article but not bonded to the first surface 112 of the second glass-ceramic article. Glass stacks 210 with more than three glass-ceramic articles can include additional parting layers similarly disposed between the additional glass-ceramic articles.

In some embodiments, glass stack 210 can include a parting layer 220 between a bottom-most glass article 110 of the stack 210 and a bottom setter plate 204. In some embodiments, glass stack 210 can include a parting layer 220 between a top-most glass article 110 of the stack 210 and a top setter plate 204. In some embodiments, a parting layer 220 can be coated on the surface of a setter plate 204 and disposed between the setter plate's surface and a glass article 110. A coefficient of thermal expansion (CTE) mismatch between the glass composition of a glass article 110 and the setter plate material can lead to scuffing if stiction occurs during a ceramming cycle. The use of a parting layer 220 disposed between the surface of a setter plate 204 and a glass article 110 can prevent scuffing defects. In embodiments where the surface of a setter plate 204 is coated with parting layer 220, the parting agent material can not only reduce the CTE mismatch, but can also extend the lifetime of the setter plate 204 by reducing wear of the setter plate 204.

In some embodiments, a setter plate 204 can made from a material that does not react with the glass composition of glass articles 110. In such embodiments, a parting layer 220 may not be located between the top-most glass article 110 of a glass stack 210 and a top setter plate 204 and/or between the bottom-most glass article 110 of a glass stack 210 and a bottom setter plate 204.

In some embodiments, ceramming stack 200 can include a carrier plate 202 that supports one or more glass stacks 210 and one or more setter plates 204. The structure and material of carrier plate 202 can be selected to control the thermal uniformity of glass articles 110 in one or more glass stacks 210. In some embodiments, carrier plate 202 can be about 17% solid metal (for example, steel). In some embodiments, carrier plate 202 can be a hollow plate made of reaction bonded silicon carbide beams with about 45% solid metal. Other suitable carrier plates know in the art can be used.

Figure 3:
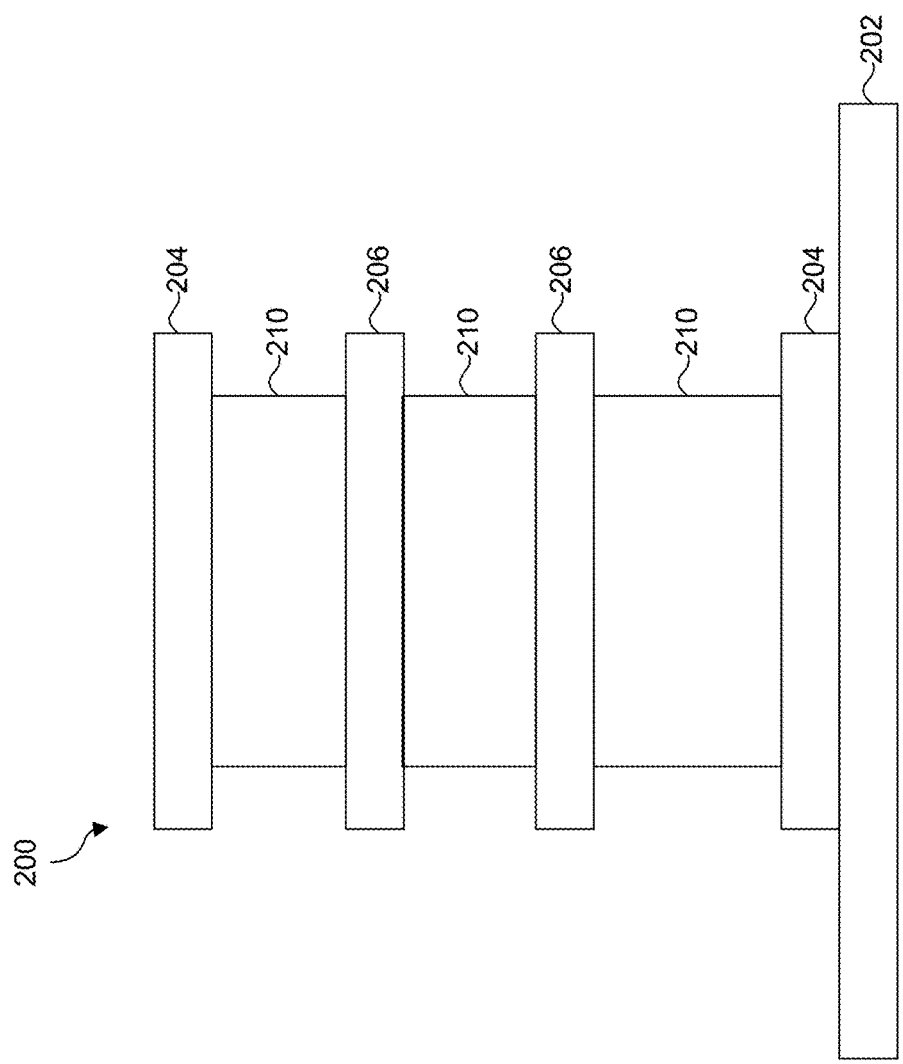
FIG. 3 illustrates a ceramming stack including interlayer setter plates according to some embodiments.

In some embodiments, as shown for example in FIG. 3, ceramming stack 200 can include interlayer setter plates 206 and a plurality of different glass stacks 210. In such embodiments, interlayer setter plates 206 are positioned between glass stacks 210. In such embodiments, each glass stack 210 can have one or more setter plates 206 between the glass stack 210 and an adjacent glass stack 210.

Generally, to form glass-ceramic articles, one or more glass stacks 210 are heated to a temperature above the annealing point for the glass composition(s) of glass articles 110 in the stack(s) 210 for a time sufficient to develop crystal nuclei (also called a nucleation phase) in glass articles 110. After being heated above the annealing point, glass articles 110 are then further heated, usually at a higher temperature between the glass annealing point and the glass softening point, to develop the crystal phase (also called a crystallization phase). The nucleation phase and the crystallization phase can be performed, for example, in a lehr or furnace. After the crystallization phase, glass articles 110 are cooled. The nucleation and crystallization steps serve to ceram glass articles 110 into glass-ceramic articles. The combination of the nucleation phase, the crystallization phase, and the cooling of glass articles 110 is referred to herein as a "ceramming cycle."

Figure 11:
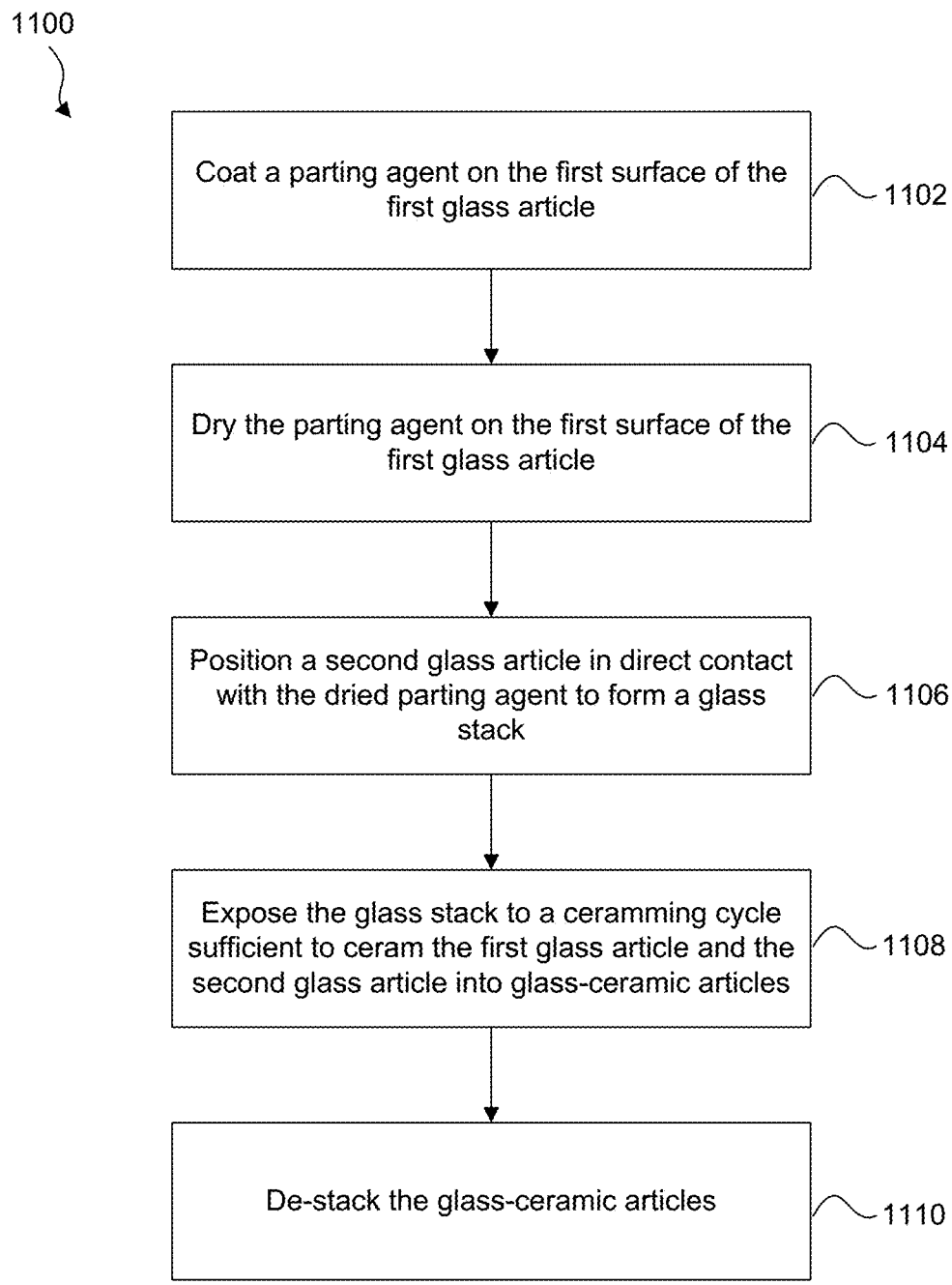
FIG. 11 illustrates a method according to some embodiments.

FIG. 11 illustrates a method 1100 of ceramming a plurality of glass articles 110 according to some embodiments. Unless stated otherwise, the steps of method 1100 need not be performed in the order set forth herein.

In step 1102, a parting agent 120 is coated on the first surface 112 and/or of the second surface 114 of a first glass article 110. In some embodiments, parting agent 120 can be coated using a spray coating technique. In some embodiments, parting agent 120 can be applying using a spray coating technique that includes atomization of a parting agent slurry. Exemplary spray atomization coating equipment includes, but is not limited to, a rotary atomizer, or an air atomizer, or ultrasonic spray process. Other exemplary coating techniques for step 1102 include, but are not limited to, high pressure spraying or inkjet coating.

In some embodiments, step 1102 can include coating the parting agent 120 on the first surface 112 of the first glass article 110 article using a coating process that does not coat the parting agent 120 on the second surface 114 of the first glass article 110. In some embodiments, step 1102 can include coating the parting agent 120 on the second surface 114 of the first glass article 110 article using a coating process that does not coat the parting agent 120 on the first surface 112 of the first glass article 110. In some embodiments, first glass article 110 can be positioned over a setter plate (for example, setter plate 204) before step 1102. In such embodiments, the first glass article 110 can be coated with the parting agent 120 on the setter plate.

In step 1104, parting agent 120 is dried on the first surface 112 and/or the second surface 114 of the first glass article 110, thereby forming a parting layer 220. Drying step 1104 can utilize suitable drying technologies, including but not limited to, convection driers and infrared (IR) driers. The drying conditions can be tailored to minimize equipment footprint and dry time without inducing drying defects such as blisters or reticulation.

After step 1104, a second glass article 110 is positioned in direct contact with the dried parting agent (i.e., parting layer 220) to a form a glass stack 210 including the first glass article 110, the second glass article 110, and the dried parting agent (i.e., parting layer 220) in step 1106. Positioning the second glass article 110 in direct contact with the dried parting agent can include positioning the second glass article 110 over the first glass article 110 or placing the first glass article 110 over the second glass article 110. For example, in some embodiments, a second surface 114 of the second glass article 110 can be positioned in direct contact with the dried parting agent in step 1106. In some embodiments, step 1106 can include positioning more than two glass articles 110 in the same manner as described for the second glass article, with each article sequentially stacked adjacent the preceding one.

In step 1108, the glass stack 210 is exposed to a ceramming cycle sufficient to ceram the first glass article 110 and the second glass article 110 into glass-ceramic articles.

In particular embodiments, the ceramming cycle can include heating glass stack 210 to a nucleation temperature, maintaining the nucleation temperature for a predetermined period of time, heating glass stack 210 to a crystallization temperature, and maintaining the crystallization temperature for a predetermined period of time. In some embodiments, the step of heating glass stack 210 to a nucleation temperature can include heating glass stack 210 to a nucleation temperature of about 700° C. at a rate of 1-10° C./min. Glass stack 210 can be maintained at the nucleation temperature for a time of from about 0.25 hour to about 4 hours. In some embodiments, the step of heating glass stack 210 to the crystallization temperature can include heating glass stack 210 to a crystallization temperature of about 800° C. at a rate of 1-10° C./min. Glass stack 210 can be maintained at the crystallization temperature for a time of from about 0.25 hour to about 4 hours.

These above-described nucleation and crystallization steps are exemplary; other heat treatment schedules (including varying times and/or temperatures) can be used, depending on the particular embodiment. The temperature-temporal profile of the heat treatment steps can be selected to produce one or more of the following attributes: crystalline phase(s) of glass-ceramic articles, proportions of one or more major crystalline phases and/or one or more minor crystalline phases and residual glass, crystal phase assemblages of one or more predominate crystalline phase and/or one or more minor crystalline phases and residual glass, and grain sizes or grain size distributions among one or more major crystalline phases and/or one or more minor crystalline phases. These attributes can influence the final integrity, quality, color, and/or opacity of the resultant glass-ceramic articles.

Following the nucleation and crystallization steps, glass stack 210 is cooled back to room temperature. In some embodiments, the cooling rate is controlled down to a temperature of about 450° C., after which the glass-ceramic article may be quenched. Accordingly, in some embodiments, the ceramming process can include a controlled cooling at a rate of about 4° C./min from the maximum temperature to a temperature of about 450° C., followed by a quenching step to bring the temperature to approximately room temperature.

After the ceramming cycle of step 1108 is completed, the glass-ceramic articles can be de-stacked in step 1110.

Glass Compositions

Glass articles 110 can be made from any glass composition that is suitable for forming glass-ceramic articles. The glass composition of glass articles 110 can affect the mechanical and optical properties of glass-ceramic articles made using glass articles 110. In some embodiments, the glass composition can be selected such that the resultant glass-ceramic article has a petalite crystalline phase and a lithium silicate crystalline phase. In some embodiments, the petalite crystalline phase and the lithium silicate crystalline phase can have higher weight percentages than other crystalline phases present in the glass-ceramic article.

By way of example and not limitation, in some embodiments, glass articles 110 can be formed from a glass composition including from about 55 wt % to about 80 wt % $SiO_2$, from about 2 wt % to about 20 wt % $Al_2O_3$, from about 5 wt % to about 20 wt % $Li_2O$, from about 0 wt % to about 10 wt % $B_2O_3$, from about 0 wt % to about 5 wt % $Na_2O$, from about 0 wt % to about 10 wt % ZnO, from about 0.5 wt % to about 6 wt % $P_2O_5$, and from about 0.2 wt % to about 15 wt % $ZrO_2$.

$SiO_2$, an oxide involved in the formation of glass, can function to stabilize the networking structure of glasses and glass-ceramics. In some embodiments, the concentration of $SiO_2$ can be sufficiently high in order to form petalite crystal phase when the glass article cerammed. The amount of $SiO_2$ can be limited to control the melting temperature of the glass, as the melting temperature of pure $SiO_2$ or high-$SiO_2$ glasses is undesirably high. In some embodiments, the glass or glass-ceramic composition comprises from about 55 wt % to about 80 wt % $SiO_2$. In some embodiments, the glass or glass-ceramic composition comprises from about 69 wt % to about 80 wt % $SiO_2$. In some embodiments, the glass or glass-ceramic composition can comprise from about 55 wt % to about 80 wt %, about 55 wt % to about 77 wt %, about 55 wt % to about 75 wt %, about 55 wt % to about 73 wt %, about 60 wt % to about 80 wt %, about 60 wt % to about 77 wt %, about 60 wt % to about 75 wt %, about 60 wt % to about 73 wt %, about 69 wt % to about 80 wt %, about 69 wt % to about 77 wt %, about 69 wt % to about 75 wt %, about 69 wt % to about 73 wt %, about 70 wt % to about 80 wt %, about 70 wt % to about 77 wt %, about 70 wt % to about 75 wt %, about 70 wt % to about 73 wt %, about 73 wt % to about 80 wt %, about 73 wt % to about 77 wt %, about 73 wt % to about 75 wt %, about 75 wt % to about 80 wt %, about 75 wt % to about 77 wt %, or about 77 wt % to about 80 wt % $SiO_2$.

$Al_2O_3$ in a glass or glass-ceramic composition can also provide stabilization to the network and can provide improved mechanical properties and chemical durability. If the amount of $Al_2O_3$ is too high, however, the fraction of lithium silicate crystals can be decreased, possibly to the extent that an interlocking structure cannot be formed. The amount of $Al_2O_3$ can also be tailored to control viscosity. If the amount of $Al_2O_3$ is too high, the viscosity of the melt is also generally increased. In some embodiments, the glass or glass-ceramic composition can comprise from about 2 wt % to about 20 wt % $Al_2O_3$. In some embodiments, the glass or glass-ceramic composition can comprise from about 6 wt % to about 9 wt % $Al_2O_3$. In some embodiments, the glass or glass-ceramic composition can comprise from about 2 wt % to about 20 wt %, about 2 wt % to about 18 wt %, about 2 wt % to about 15 wt %, about 2 wt % to about 12 wt %, about 2 wt % to about 10 wt %, about 2 wt % to about 9 wt %, about 2 wt % to about 8 wt %, about 2 wt % to about 5 wt %, about 5 wt % to about 20 wt %, about 5 wt % to about 18 wt %, about 5 wt % to about 15 wt %, about 5 wt % to about 12 wt %, about 5 wt % to about 10 wt %, about 5 wt % to about 9 wt %, about 5 wt % to about 8 wt %, 6 wt % to about 20 wt %, about 6 wt % to about 18 wt %, about 6 wt % to about 15 wt %, about 6 wt % to about 12 wt %, about 6 wt % to about 10 wt %, about 6 wt % to about 9 wt %, 8 wt % to about 20 wt %, about 8 wt % to about 18 wt %, about 8 wt % to about 15 wt %, about 8 wt % to about 12 wt %, about 8 wt % to about 10 wt %, 10 wt % to about 20 wt %, about 10 wt % to about 18 wt %, about 10 wt % to about 15 wt %, about 10 wt % to about 12 wt %, 12 wt % to about 20 wt %, about 12 wt % to about 18 wt %, or about 12 wt % to about 15 wt % $Al_2O_3$.

In some embodiments, the glass or glass-ceramic composition can comprise $Li_2O$, which can aid in forming both petalite and lithium silicate crystal phases. To obtain petalite and lithium silicate as the predominant crystal phases, it can be desirable to have at least about 7 wt % $Li_2O$ in the composition. Additionally, it has been found that once $Li_2O$ gets too high (greater than about 15 wt %), the composition becomes very fluid. Accordingly, in some embodiments, the glass or glass-ceramic composition can comprise from about 5 wt % to about 20 wt % $Li_2O$. In some embodiments, the glass or glass-ceramic composition can comprise from about 10 wt % to about 14 wt % $Li_2O$. In some embodiments, the glass or glass-ceramic composition can comprise from about 5 wt % to about 20 wt %, about 5 wt % to about 18 wt %, about 5 wt % to about 16 wt %, about 5 wt % to about 14 wt %, about 5 wt % to about 12 wt %, about 5 wt % to about 10 wt %, about 5 wt % to about 8 wt %, about 7 wt % to about 20 wt %, about 7 wt % to about 18 wt %, about 7 wt % to about 16 wt %, about 7 wt % to about 14 wt %, about 7 wt % to about 12 wt %, about 7 wt % to about 10 wt %, about 10 wt % to about 20 wt %, about 10 wt % to about 18 wt %, about 10 wt % to about 16 wt %, about 10 wt % to about 14 wt %, about 10 wt % to about 12 wt %, about 12 wt % to about 20 wt %, about 12 wt % to about 18 wt %, about 12 wt % to about 16 wt %, about 12 wt % to about 14 wt %, about 14 wt % to about 20 wt %, about 14 wt % to about 18 wt %, about 14 wt % to about 16 wt %, about 16 wt % to about 20 wt %, about 16 wt % to about 18 wt %, or about 18 wt % to about 20 wt % $Li_2O$.

As noted above, $Li_2O$ is generally useful for forming various glass-ceramics, but the other alkali oxides tend to decrease glass ceramic formation and form an aluminosilicate residual glass in the glass-ceramic. It has been found that more than about 5 wt % $Na_2O$ or $K_2O$, or combinations thereof, leads to an undesirable amount of residual glass, which can lead to deformation during crystallization and undesirable microstructures from a mechanical property perspective. The composition of the residual glass can be tailored to control viscosity during crystallization, minimizing deformation or undesirable thermal expansion, or control microstructure properties. Therefore, in some embodiments, the glass or glass-ceramic composition can have low amounts of non-lithium alkali oxides. In some embodiments, the glass or glass-ceramic composition can comprise from about 0 wt % to about 5 wt % $R_2O$, wherein R is one or more of the alkali cations Na and K. In some embodiments, the glass or glass-ceramic composition can comprise from about 1 wt % to about 3 wt % $R_2O$, wherein R is one or more of the alkali cations Na and K. In some embodiments, the glass or glass-ceramic composition can comprise from 0 wt % to about 5 wt %, 0 wt % to about 4 wt %, 0 wt % to about 3 wt %, 0 wt % to about 2 wt %, 0 wt % to about 1 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 5 wt %, about 1 wt % to about 4 wt %, about 1 wt % to about 3 wt %, about 1 wt % to about 2 wt %, about 2 wt % to about 5 wt %, about 2 wt % to about 4 wt %, about 2 wt % to about 3 wt %, about 3 wt % to about 5 wt %, about 3 wt % to about 4 wt %, or about 4 wt % to about 5 wt % $Na_2O$, $K_2O$, or combinations thereof.

In some embodiments, the glass or glass-ceramic composition can include $P_2O_5$. $P_2O_5$ can function as a nucleating agent to produce bulk nucleation. If the concentration of $P_2O_5$ is too low, the precursor glass does crystallize, but only at higher temperatures (due to a lower viscosity) and from the surface inward, yielding a weak and often deformed body. However, if the concentration of $P_2O_5$ is too high, the devitrification, upon cooling during the formation of glass articles, can be difficult to control. In some embodiments, the glass or glass-ceramic composition can comprise from >0 wt % to about 6 wt % $P_2O_5$. In some embodiments, the glass or glass-ceramic composition can comprise from about 2 wt % to about 4 wt % $P_2O_5$. In some embodiments, the glass or glass-ceramic composition can comprise from about 1.5 wt % to about 2.5 wt % $P_2O_5$. In some embodiments, the glass or glass ceramic composition can comprise from 0 wt % to about 6 wt %, 0 wt % to about 5.5 wt %, 0 wt % to 5 wt %, 0 wt % to about 4.5 wt %, 0 wt % to about 4 wt %, 0 wt % to about 3.5 wt %, 0 wt % to about 3 wt %, 0 wt % to about 2.5 wt %, 0 wt % to about 2 wt %, 0 wt % to about 1.5 wt %, 0 wt % to about 1 wt %, >0 wt % to about 6 wt %, >0 wt % to about 5.5 wt %, >0 wt % to 5 wt %, >0 wt % to about 4.5 wt %, >0 wt % to about 4 wt %, >0 wt % to about 3.5 wt %, >0 wt % to about 3 wt %, >0 wt % to about >2.5 wt %, 0 wt % to about 2 wt %, >0 wt % to about 1.5 wt %, >0 wt % to about 1 wt %, about 0.5 wt % to about 6 wt %, about 0.5 wt % to about 5.5 wt %, about 0.5 wt % to 5 wt %, about 0.5 wt % to about 4.5 wt %, about 0.5 wt % to about 4 wt %, about 0.5 wt % to about 3.5 wt %, about 0.5 wt % to about 3 wt %, about 0.5 wt % to about 2.5 wt %, about 0.5 wt % to about 2 wt %, about 0.5 wt % to about 1.5 wt %, about 0.5 wt % to about 1 wt %, about 1 wt % to about 6 wt %, about 1 wt % to about 5.5 wt %, about 1 wt % to 5 wt %, about 1 wt % to about 4.5 wt %, about 1 wt % to about 4 wt %, about 1 wt % to about 3.5 wt %, about 1 wt % to about 3 wt %, about 1 wt % to about 2.5 wt %, about 1 wt % to about 2 wt %, about 1 wt % to about 1.5 wt %, about 1.5 wt % to about 6 wt %, about 1.5 wt % to about 5.5 wt %, about 1.5 wt % to 5 wt %, about 1.5 wt % to about 4.5 wt %, about 1.5 wt % to about 4 wt %, about 1.5 wt % to about 3.5 wt %, about 1.5 wt % to about 3 wt %, about 1.5 wt % to about 2.5 wt %, about 1.5 wt % to about 2 wt %, about 2 wt % to about 6 wt %, about 2 wt % to about 5.5 wt %, about 2 wt % to 5 wt %, about 2 wt % to about 4.5 wt %, about 2 wt % to about 4 wt %, about 2 wt % to about 3.5 wt %, about 2 wt % to about 3 wt %, about 2 wt % to about 2.5 wt %, about 2.5 wt % to about 6 wt %, about 2.5 wt % to about 5.5 wt %, about 2.5 wt % to 5 wt %, about 2.5 wt % to about 4.5 wt %, about 2.5 wt % to about 4 wt %, about 2.5 wt % to about 3.5 wt %, about 2.5 wt % to about 3 wt %, about 3 wt % to about 6 wt %, about 3 wt % to about 5.5 wt %, about 3 wt % to 5 wt %, about 3 wt % to about 4.5 wt %, about 3 wt % to about 4 wt %, about 3 wt % to about 3.5 wt %, about 3.5 wt % to about 6 wt %, about 3.5 wt % to about 5.5 wt %, about 3.5 wt % to 5 wt %, about 3.5 wt % to about 4.5 wt %, about 3.5 wt % to about 4 wt %, about 4 wt % to about 6 wt %, about 4 wt % to about 5.5 wt %, about 4 wt % to 5 wt %, about 4 wt % to about 4.5 wt %, about 4.5 wt % to about 6 wt %, about 4.5 wt % to about 5.5 wt %, about 4.5 wt % to about 5 wt %, about 5 wt % to about 6 wt %, about 5 wt % to about 5.5 wt %, or about 5.5 wt % to about 6 wt % $P_2O_5$.

In some embodiments, the glass or glass-ceramic composition can comprise $ZrO_2$. It is generally found that $ZrO_2$ can improve the stability of $Li_2O$—$Al_2O_3$—$SiO_2$—$P_2O_5$ glass by significantly reducing glass devitrification during forming and lowering liquidus temperature. At concentrations above 8 wt %, $ZrSiO_4$ can form a primary liquidus phase at a high temperature, which significantly lowers liquidus viscosity. Transparent glasses can be formed when the glass contains over 2 wt % $ZrO_2$. The addition of $ZrO_2$ can also help decrease the petalite grain size, which aids in the formation of a transparent glass-ceramic. In some embodiments, the glass or glass-ceramic composition can comprise from about 0.2 wt % to about 15 wt % $ZrO_2$. In some embodiments, the glass or glass-ceramic composition can comprise from about 2 wt % to about 4 wt % $ZrO_2$. In some embodiments, the glass or glass-ceramic composition can comprise from about 0.2 wt % to about 15 wt %, about 0.2 wt % to about 12 wt %, about 0.2 wt % to about 10 wt %, about 0.2 wt % to about 8 wt %, about 0.2 wt % to about 6 wt %, about 0.2 wt % to about 4 wt %, about 0.5 wt % to about 15 wt %, about 0.5 wt % to about 12 wt %, about 0.5 wt % to about 10 wt %, about 0.5 wt % to about 8 wt %, about 0.5 wt % to about 6 wt %, about 0.5 wt % to about 4 wt %, about 1 wt % to about 15 wt %, about 1 wt % to about 12 wt %, about 1 wt % to about 10 wt %, about 1 wt % to about 8 wt %, about 1 wt % to about 6 wt %, about 1 wt % to about 4 wt %, about 2 wt % to about 15 wt %, about 2 wt % to about 12 wt %, about 2 wt % to about 10 wt %, about 2 wt % to about 8 wt %, about 2 wt % to about 6 wt %, about 2 wt % to about 4 wt %, about 3 wt % to about 15 wt %, about 3 wt % to about 12 wt %, about 3 wt % to about 10 wt %, about 3 wt % to about 8 wt %, about 3 wt % to about 6 wt %, about 3 wt % to about 4 wt %, about 4 wt % to about 15 wt %, about 4 wt % to about 12 wt %, about 4 wt % to about 10 wt %, about 4 wt % to about 8 wt %, about 4 wt % to about 6 wt %, about 8 wt % to about 15 wt %, about 8 wt % to about 12 wt %, about 8 wt % to about 10 wt %, about 10 wt % to about 15 wt %, about 10 wt % to about 12 wt %, or about 12 wt % to about 15 wt % $ZrO_2$.

In some embodiments, the glass or glass-ceramic composition can comprise $B_2O_3$. $B_2O_3$ is conducive to providing a glass article with a low melting temperature. Furthermore, the addition of $B_2O_3$ to a glass or glass-ceramic composition can help achieve an interlocking crystal microstructure and can also improve the damage resistance of a glass-ceramic article. When boron in the residual glass is not charge balanced by alkali oxides or divalent cation oxides, it will be in trigonal-coordination state (or three-coordinated boron), which opens up the structure of the glass. The network around these three coordinated boron is not as rigid as tetrahedrally coordinated (or four-coordinated) boron. Without being bound by theory, it is believed that glass and glass-ceramic articles that include three-coordinated boron can tolerate some degree of deformation before crack formation. By tolerating some deformation, the Vickers indentation crack initiation values are increased. Fracture toughness of glass or glass-ceramic articles that include three-coordinated boron can also be increased. Without being bound by theory, it is believed that the presence of boron in the residual glass of the glass-ceramic lowers the viscosity of the residual glass, which facilitates the growth of lithium silicate crystals, especially large crystals having a high aspect ratio. A greater amount of three-coordinated boron (in relation to four-coordinated boron) is believed to result in glass-ceramics that exhibit a greater Vickers indentation crack imitation load. In some embodiments, the amount of three-coordinated boron (as a percent of total $B_2O_3$) can be about 40% or greater, 50% or greater, 75% or greater, 85% or greater, or even 95% or greater. The amount of boron in general should be controlled to maintain chemical durability and mechanical strength of the cerammed bulk glass-ceramic.

In some embodiments, the glass or glass-ceramic composition can comprise from 0 wt % to about 10 wt % or from 0 wt % to about 2 wt % $B_2O_3$. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, >0 wt % to about 10 wt %, >0 wt % to about 9 wt %, >0 wt % to about 8 wt %, >0 wt % to about 7 wt %, >0 wt % to about 6 wt %, >0 wt % to about 5 wt %, >0 wt % to about 4 wt %, >0 wt % to about 3 wt %, >0 wt % to about 2 wt %, >0 wt % to about 1 wt %, about 1 wt % to about 10 wt %, about 1 wt % to about 8 wt %, about 1 wt % to about 6 wt %, about 1 wt % to about 5 wt %, about 1 wt % to about 4 wt %, about 1 wt % to about 2 wt %, about 2 wt % to about 10 wt %, about 2 wt % to about 8 wt %, about 2 wt % to about 6 wt %, about 2 wt % to about 4 wt %, about 3 wt % to about 10 wt %, about 3 wt % to about 8 wt %, about 3 wt % to about 6 wt %, about 3 wt % to about 4 wt %, about 4 wt % to about 5 wt %, about 5 wt % to about 8 wt %, about 5 wt % to about 7.5 wt %, about 5 wt % to about 6 wt %, or about 5 wt % to about 5.5 wt % $B_2O_3$.

In some embodiments, the glass or glass-ceramic composition can include MgO. MgO can enter petalite crystals in a partial solid solution. In some embodiments, the glass or glass-ceramic composition can comprise from 0 wt % to about 8 wt % MgO. In some embodiments, the glass or glass-ceramic composition can comprise from 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 8 wt %, about 4 wt % to about 7 wt %, about 4 wt % to about 6 wt %, about 4 wt % to about 5 wt %, about 5 wt % to about 8 wt %, about 5 wt % to about 7 wt %, about 5 wt % to about 6 wt %, about 6 wt % to about 8 wt %, about 6 wt % to about 7 wt %, or about 7 wt % to about 8 wt % MgO.

In some embodiments, the glass or glass-ceramic composition can comprise ZnO. ZnO can enter petalite crystals in a partial solid solution. In some embodiments, the glass or glass-ceramic composition can comprise from 0 wt % to about 10 wt % ZnO. In some embodiments, the glass or glass-ceramic composition can comprise from 0 wt % to about 10 wt %, 0 wt % to about 9 wt %, 0 wt % to about 8 wt %, 0 wt % to about 7 wt %, 0 wt % to about 6 wt %, 0 wt % to about 5 wt %, 0 wt % to about 4 wt %, 0 wt % to about 3 wt %, 0 wt % to about 2 wt %, 0 wt % to about 1 wt %, about 1 wt % to about 10 wt %, about 1 wt % to about 9 wt %, about 1 wt % to about 8 wt %, about 1 wt % to about 7 wt %, about 1 wt % to about 6 wt %, about 1 wt % to about 5 wt %, about 1 wt % to about 4 wt %, about 1 wt % to about 3 wt %, about 1 wt % to about 2 wt %, about 2 wt % to about 10 wt %, about 2 wt % to about 9 wt %, about 2 wt % to about 8 wt %, about 2 wt % to about 7 wt %, about 2 wt % to about 6 wt %, about 2 wt % to about 5 wt %, about 2 wt % to about 4 wt %, about 2 wt % to about 3 wt %, about 3 wt % to about 10 wt %, about 3 wt % to about 9 wt %, about 3 wt % to about 8 wt %, about 3 wt % to about 7 wt %, about 3 wt % to about 6 wt %, about 3 wt % to about 5 wt %, about 3 wt % to about 4 wt %, about 4 wt % to about 10 wt %, about 4 wt % to about 9 wt %, about 4 wt % to about 8 wt %, about 4 wt % to about 7 wt %, about 4 wt % to about 6 wt %, about 4 wt % to about 5 wt %, about 5 wt % to about 10 wt %, about 5 wt % to about 9 wt %, about 5 wt % to about 8 wt %, about 5 wt % to about 7 wt %, about 5 wt % to about 6 wt %, about 6 wt % to about 10 wt %, about 6 wt % to about 9 wt %, about 6 wt % to about 8 wt %, about 6 wt % to about 7 wt %, about 7 wt % to about 10 wt %, about 7 wt % to about 9 wt %, about 7 wt % to about 8 wt %, about 8 wt % to about 10 wt %, about 8 wt % to about 9 wt %, or about 9 wt % to about 10 wt % ZnO.

In some embodiments, the glass or glass ceramic composition can further include one or more constituents, such as, by way of example and not limitation, $TiO_2$, $CeO_2$, and $SnO_2$. Additionally or alternatively, antimicrobial components can be added to the glass or glass-ceramic composition. Antimicrobial components that can be added to the glass or glass-ceramic include, but are not limited to, Ag, AgO, Cu, CuO, $Cu_2O$, and the like. In some embodiments, the glass or glass-ceramic composition can further include a chemical fining agent. Such fining agents include, but are not limited to, $SnO_2$, $As_2O_3$, $Sb_2O_3$, F, Cl, and Br. Additional details on glass and/or glass-ceramic compositions suitable for use in various embodiments can be found in, for example, U.S. Patent Application Publication No. 2016/0102010 entitled "High Strength Glass-Ceramics Having Petalite and Lithium Silicate Structures," filed Oct. 8, 2015, which is incorporated by reference herein in its entirety.

Examples

Table 2 below shows various aqueous parting agent slurry compositions (Example Nos. 1-15) evaluated to determine their suitability for use as a parting agent layer for a glass-ceramic manufacturing process as described in the present disclosure. The hexagonal boron nitride for Example No. 8 is hexagonal boron nitride available from Zyp Coatings. For Examples that list a weight percent range for a component (for example, 10-25 wt % of NYACOL® AL20 Example No. 7), various sample slurries having the component at weight percentages within the range were tested. The slurry of Example No. 5 was mixed by a blending process to facilitate better mixing of the silica soot and dispersant and to help break up agglomerate particles.

TABLE 2

| Example No. | Solids | Binders | Dispersants |
|---|---|---|---|
| 1 | Corning Silica Soot (14.29 wt %) | NYACOL® AL20 (5.71 wt %) | Nitric Acid ($HNO_3$) (0.062 wt %) |
| 2 | Corning Silica Soot (20 wt %) | None | Citric Acid (<0.05 wt %), pH 3 |
| 3 | Corning Silica Soot (20 wt %) | None | Phosphoric Acid (0.45 wt % of 85% $H_3PO_4$)) |
| 4 | Corning Silica Soot (16.67 wt %) | NEXSIL ™ 8 Colloidal Silica (6.25 wt %) | None added (0.12 wt % Sodium Hydroxide from NEXSIL ™ 8) |
| 5 | Corning Silica Soot (20 wt %) (blended) | None | Citric Acid (<0.05 wt %), pH 3 |
| 6 | Corning Silica Soot (24.93 wt %) | None | Sodium Hydroxide (0.15 wt %) |
| 7 | NYACOL® AL20 (10-25 wt %) | NEXSIL ™ 8 Colloidal Silica (4-6 wt %) | Sodium Hydroxide (<2 wt %) |
| 8 | Hexagonal boron nitride particles (mean particle size | BN-E10 available from Joyne Tech (2-6 wt %) | Phosphoric Acid (<2 wt %) |

TABLE 2-continued

| Example No. | Solids | Binders | Dispersants |
|---|---|---|---|
| | 4 microns) (10-25 wt %) | | |
| 9 | NYACOL® ZR02(AC) Colloidal Zirconia (12.7 wt %) | NEXSIL® 8 Colloidal Silica (7.83 wt %) | None added (0.15 wt % Sodium Hydroxide from NEXSIL™ 8) |
| 10 | AEROSIL-OX-50 Silica Soot (17.12 wt %) | NYACOL™ AL20 (2.88 wt %) | Nitric Acid (0.032 wt %) |
| 11 | AEROSIL-OX-50 Silica Soot (20 wt %) | None | Citric Acid (<0.05 wt %), pH 3 |
| 12 | AEROSIL-OX-50 Silica Soot (20.25 wt %) | None | Sodium Hydroxide (0.25 wt %), pH 10 |
| 13 | AEROSIL-OX-50 Silica Soot (15.04 wt %) | NEXSIL™ 8 Colloidal Silica (4.96 wt %) | None added (0.1 wt % Sodium Hydroxide from NEXSIL™ 8) |
| 14 | AEROSIL-OX-50 Silica Soot (20 wt %) | None | None |
| 15 | AEROSIL-OX-50 Silica Soot (20 wt %) | None | Sodium Hydroxide (0.1 wt %) |

The parting agent slurry of each example was spray coated on a different glass sample, dried, stacked with additional glass samples, and subject to a ceramming cycle. The ceramming cycles varied for different Examples, but each cycle included a nucleation phase between 560-600° C. for 1.5-4 hours and a crystallization phase between 750-800° C. for 0.25-4 hours. The parting agent slurries of Example Nos. 1, 4, 6, 10, 12, 13, and 15 had good dispersion characteristics, good coating thickness and uniformity, and adhered and bonded well to the surface of the glass sample. These examples also exhibited little to no bonding to an adjacent sample in the cerammed article stack. The parting agent slurries of Example Nos. 2 and 3 had adequate dispersion characteristics. The parting agent slurries of Example Nos. 5, 7, 11, and 14 did not adhere well to the surface of the glass sample and resulted in loose powder on the surface of the glass sample. The parting agent slurries of Example No. 8 were too viscous to spray properly. The parting agent slurry of Example No. 9 created bonding between adjacent samples in the cerammed article stack.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" refers to a value that is within ±10% of the value stated. For example, about 3 MPa can include any number between 2.7 MPa and 3.3 MPa.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A coated glass article, comprising:
    a glass article comprising:
        a first surface;
        a second surface opposite the first surface; and
        a parting agent coated on the first surface of the glass article, the parting agent comprising an aqueous dispersion comprising amorphous silicon dioxide agglomerate particles and a dispersant,
            wherein the parting agent comprises 10 wt % to 30 wt % of the amorphous silicon dioxide agglomerate particles, and
            wherein the parting agent comprises a pH in a range of 8.5 to 11.

2. The coated glass article of claim 1, wherein the dispersant comprises a hydroxide or an acid.

3. The coated glass article of claim 1, wherein the dispersant comprises a hydroxide.

4. The coated glass article of claim 3, wherein the hydroxide is sodium hydroxide.

5. The coated glass article of claim 1, wherein the parting agent comprises 0.25 wt % to 1 wt % of the dispersant.

6. The coated glass article of claim 1, wherein the amorphous silicon dioxide agglomerate particles comprise a mean particle size in a range of 100 nanometers to 20 microns.

7. The coated glass article of claim 1, wherein the parting agent further comprises a colloidal inorganic binding agent.

8. The coated glass article of claim 7, wherein the colloidal inorganic binding agent comprises colloidal silicon dioxide.

9. The coated glass article of claim 1, wherein the parting agent comprises a viscosity in a range of 5 cP to 160 cP.

10. The coated glass article of claim 1, wherein the parting agent is not coated on the second surface of the glass article.

11. The coated glass article of claim 1, wherein the dispersant adheres the amorphous silicon dioxide agglomerate particles to the first surface of the glass article.

12. A method of ceramming a plurality of glass articles, the method comprising:
    coating a parting agent on a first surface of a first glass article, the parting agent comprising an aqueous dispersion comprising amorphous silicon dioxide agglomerate particles and a dispersant, wherein the parting agent comprises 10 wt % to 30 wt % of the amorphous silicon dioxide agglomerate particles, and wherein the parting agent comprises a pH in a range of 8.5 to 11;
    drying the parting agent on the first surface of the first glass article;
    positioning a second glass article in direct contact with the dried parting agent to form a glass stack comprising the first glass article, the second glass article, and the dried parting agent; and
    exposing the glass stack to a ceramming cycle sufficient to ceram the first glass article and the second glass article into glass-ceramic articles.

13. The method of claim 12, wherein the dried parting layer is directly adhered to the first surface of the first glass article, and wherein the dried parting layer is in direct contact with a second surface of the second glass article and is not adhered to the second surface of the second glass article.

14. A coated glass article, comprising:
    a glass article comprising:
        a first surface;
        a second surface opposite the first surface; and
        a parting agent coated on the first surface of the glass article, the parting agent comprising an aqueous dispersion comprising amorphous silicon dioxide agglomerate particles, a dispersant, and a colloidal inorganic binding agent,
        wherein the parting agent comprises a pH in a range of 8.5 to 11.

15. The coated glass article of claim 14, wherein the parting agent comprises a viscosity in a range of 5 cP to 160 cP.

16. The coated glass article of claim 15, wherein the parting agent comprises 10 wt % to 30 wt % of the amorphous silicon dioxide agglomerate particles.

17. The coated glass article of claim 14, wherein the colloidal inorganic binding agent comprises colloidal silicon dioxide.

18. A coated glass article, comprising:
    a glass article comprising:
        a first surface;
        a second surface opposite the first surface; and
        a parting agent coated on the first surface of the glass article, the parting agent comprising an aqueous dispersion comprising amorphous silicon dioxide agglomerate particles and a dispersant, wherein the parting agent comprises a pH in a range of 8.5 to 11, and wherein the parting agent comprises a viscosity in a range of 5 cP to 160 cP.

19. The coated glass article of claim 18, wherein the parting agent further comprises a colloidal inorganic binding agent, the colloidal inorganic binding agent comprising a colloidal oxide.

20. The coated glass article of claim 19, wherein the parting agent comprises 90 wt % to 100 wt % of a sum of water, the dispersant, the colloidal inorganic binding agent, and the amorphous silicon dioxide agglomerate particles.

* * * * *